United States Patent [19]

Kataoka et al.

[11] Patent Number: 4,955,701
[45] Date of Patent: Sep. 11, 1990

[54] APOCHROMAT OPTICAL SYSTEM

[75] Inventors: Yoshikazu Kataoka; Zenji Wakimoto, both of Kyoto; Takeshi Sugata, Hikone, all of Japan

[73] Assignee: Dainippon Screen Mfg. Co., Ltd., Japan

[21] Appl. No.: 345,482

[22] Filed: May 1, 1989

[30] Foreign Application Priority Data

May 2, 1988 [JP] Japan ................................ 63-109701

[51] Int. Cl.⁵ ................................................ G02B 9/62
[52] U.S. Cl. .................................... 350/481; 350/438; 350/464
[58] Field of Search ................ 350/481, 483, 464, 438

[56] References Cited

U.S. PATENT DOCUMENTS 3,088,371 5/1963 Lowenthal ........................... 350/464
4,540,250 9/1985 Seto ...................................... 350/438

Primary Examiner—Bruce Y. Arnold
Assistant Examiner—Rebecca D. Gass
Attorney, Agent, or Firm—Ostrolenk, Faber, Gerb & Soffen

[57] ABSTRACT

An apochromat optical system for a photoengraving process comprises a first lens group which includes a first lens having a positive power, a second lens made of Kultz flint glass having a negative power and a third lens in the form of a meniscus having a positive power. The first to third lenses are successively disposed in order starting from the object side. A second lens group includes the substantially same configuration of lenses as in the first lens group. The lenses of the first and second lens groups are approximately symmetrical with respect to the stop. Accordingly, the system has a high aperture ratio and small curvature of a saggital and meridional image field which can reduce an astigmatic difference in a peripheral part of an image.

4 Claims, 23 Drawing Sheets

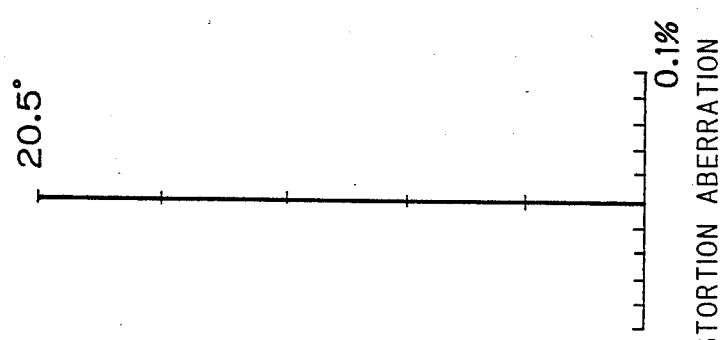
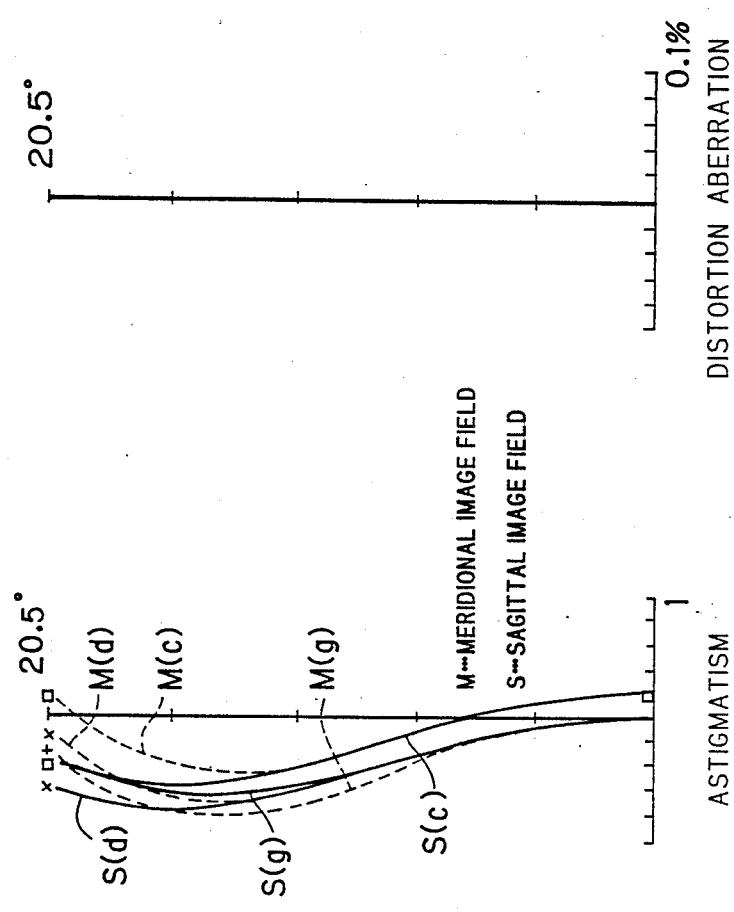
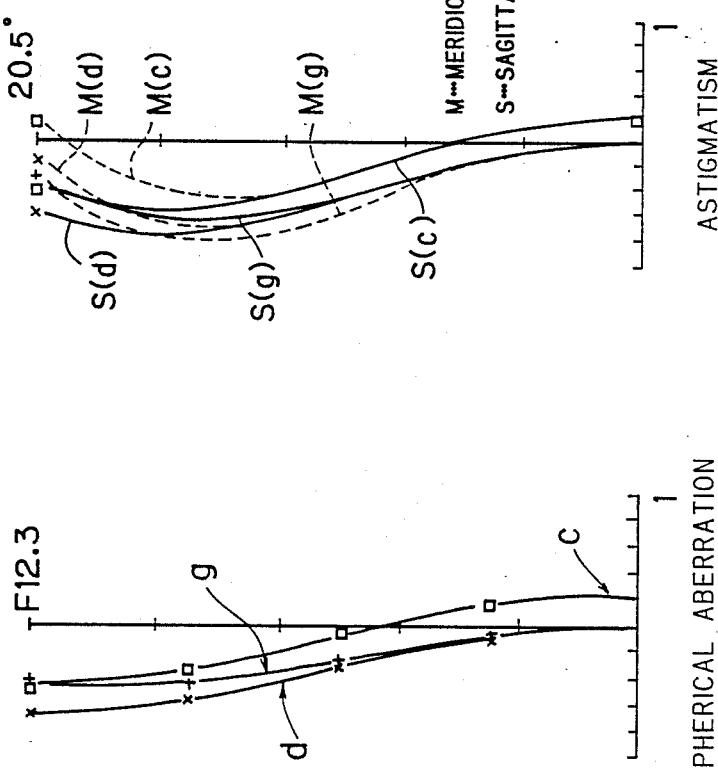

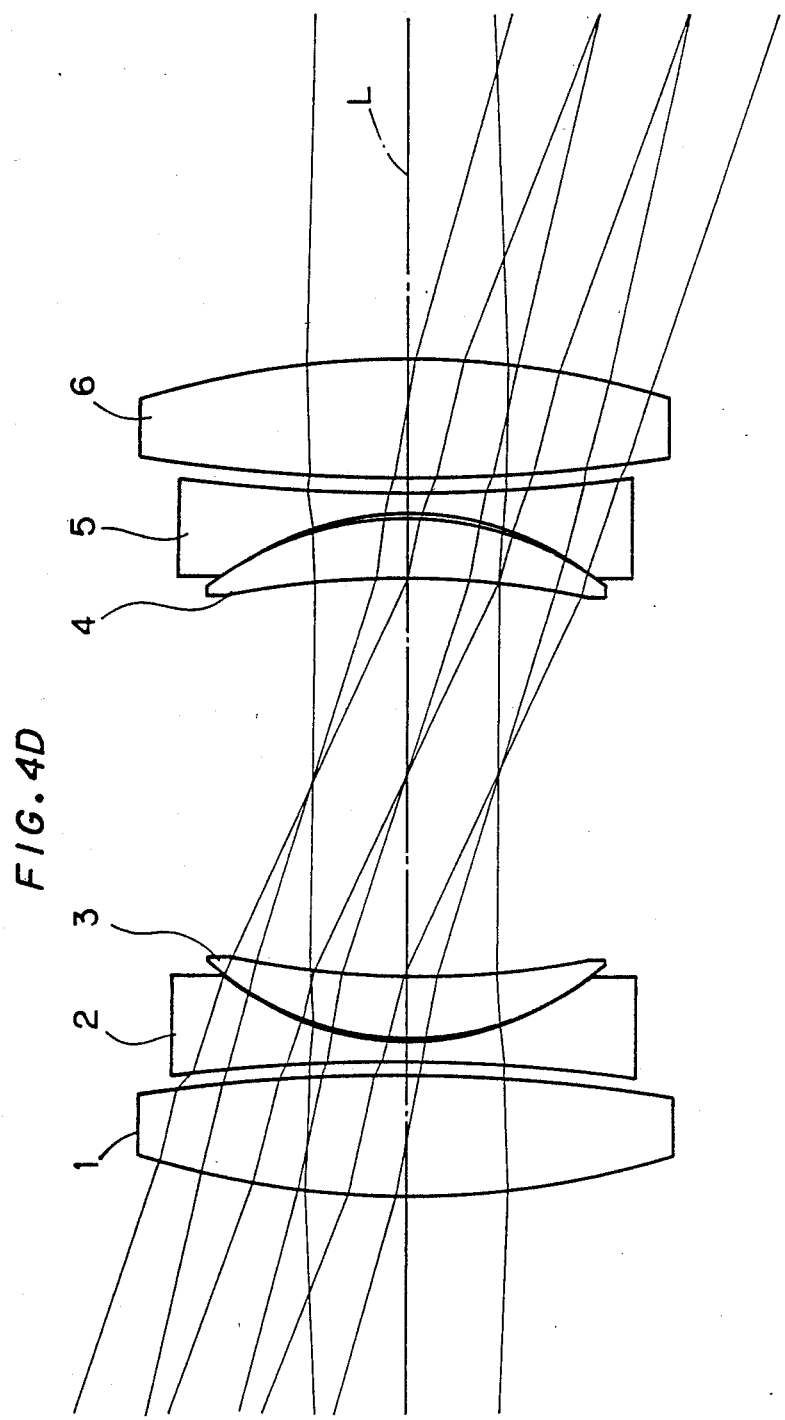

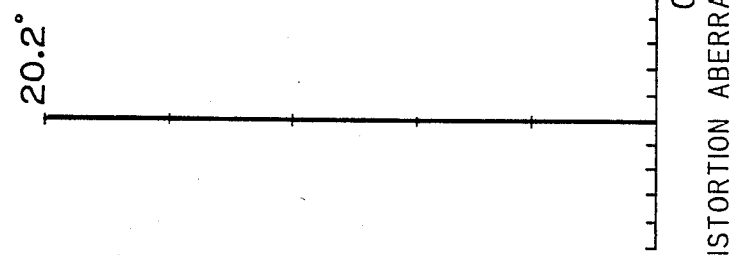
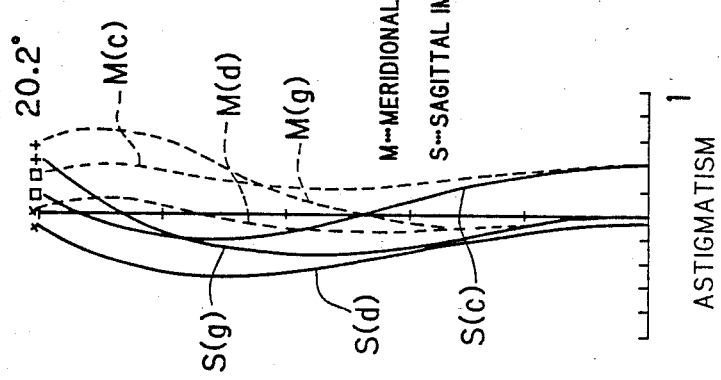
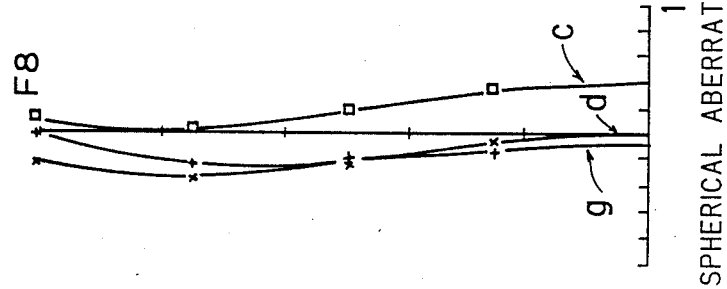

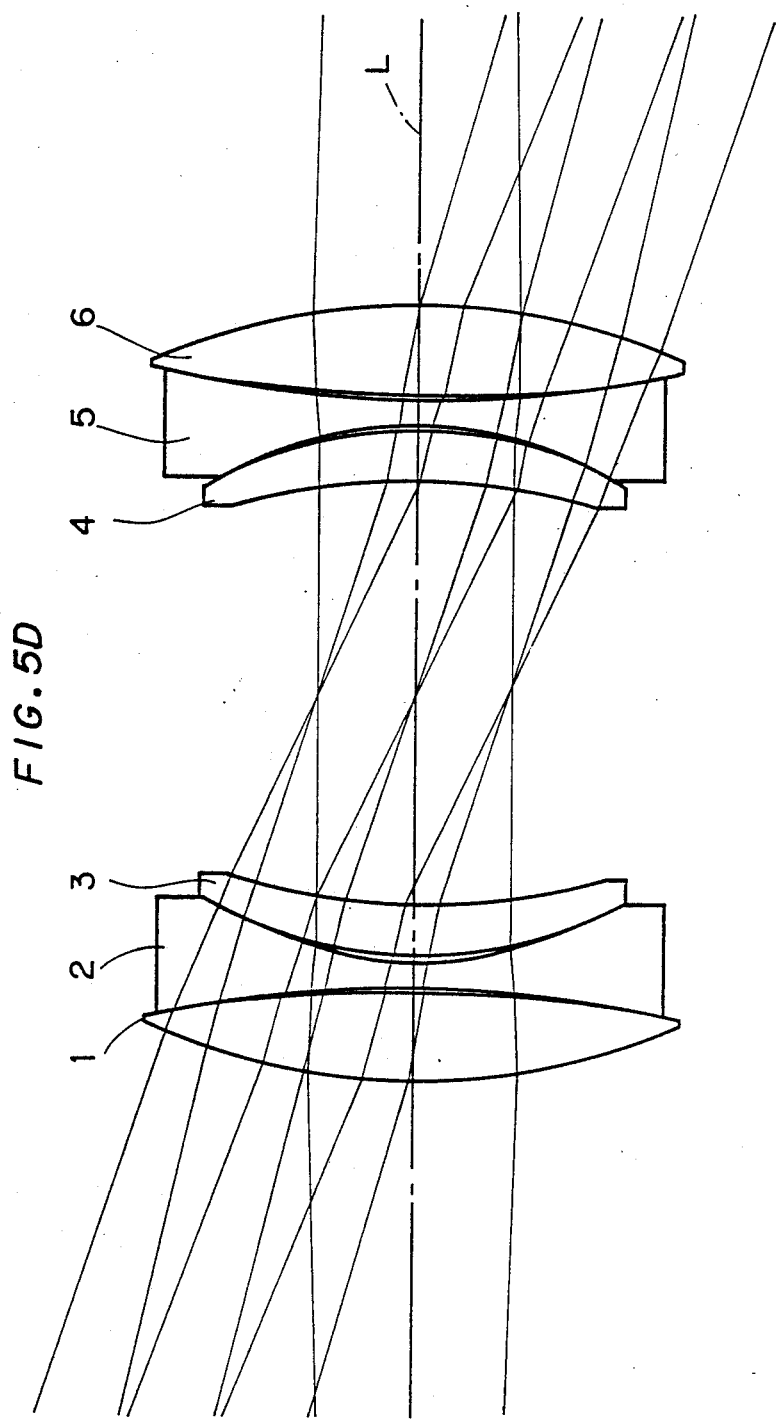

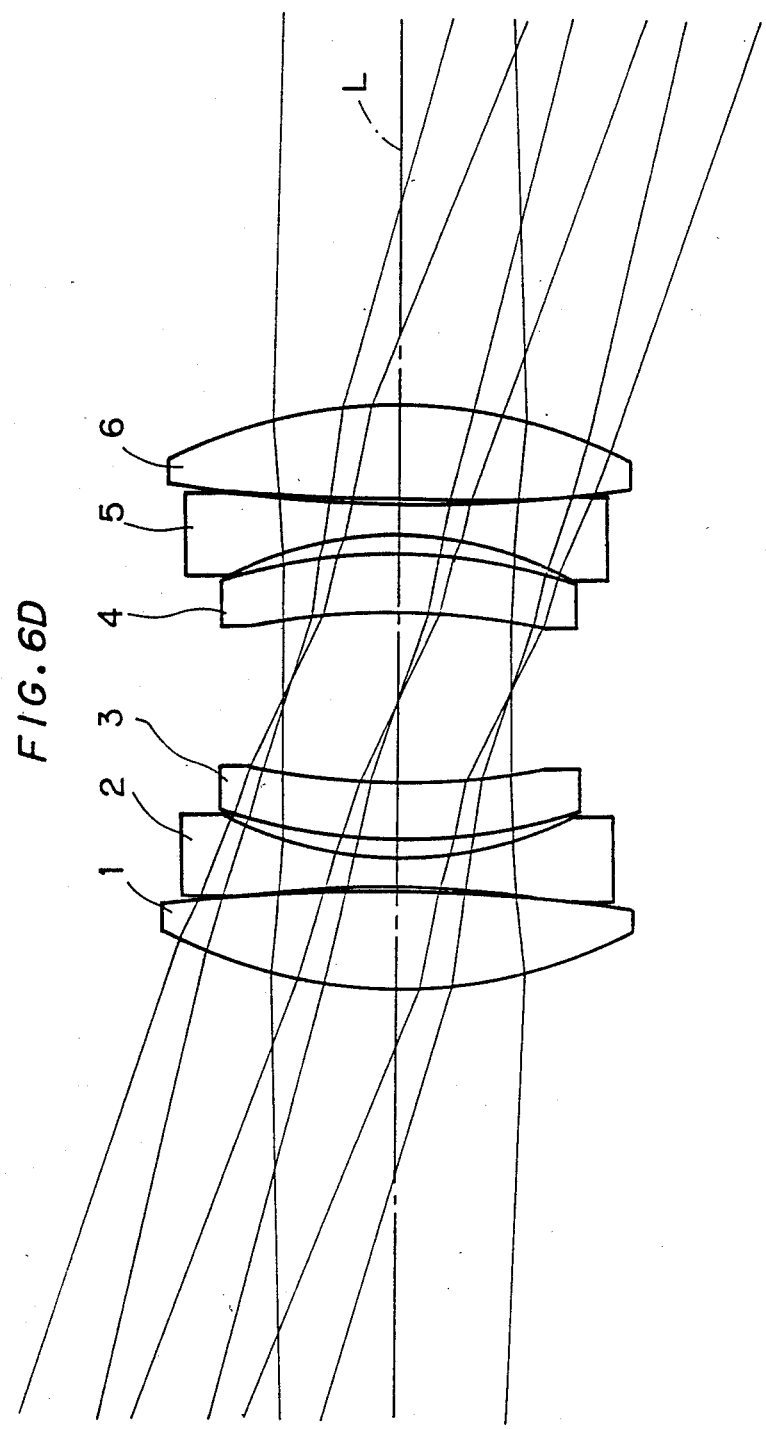

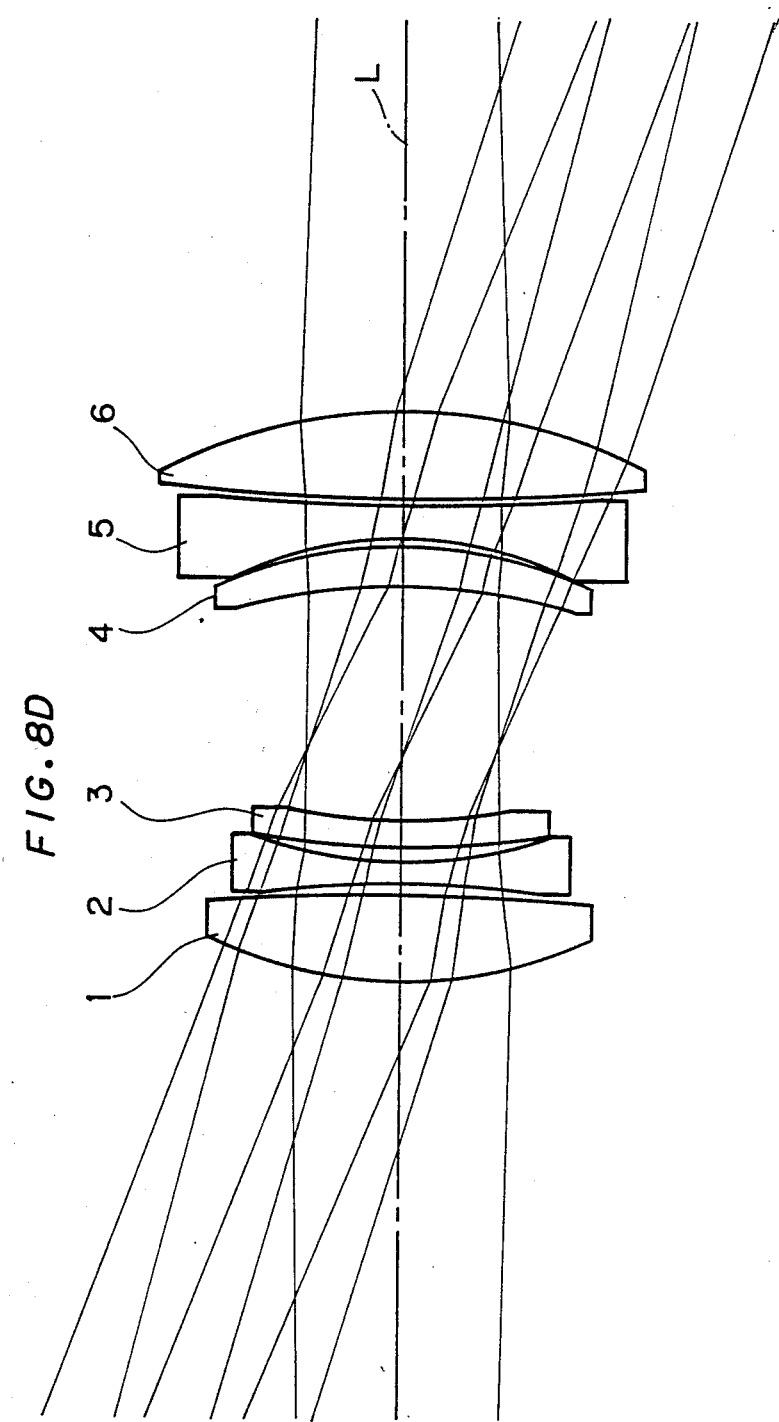

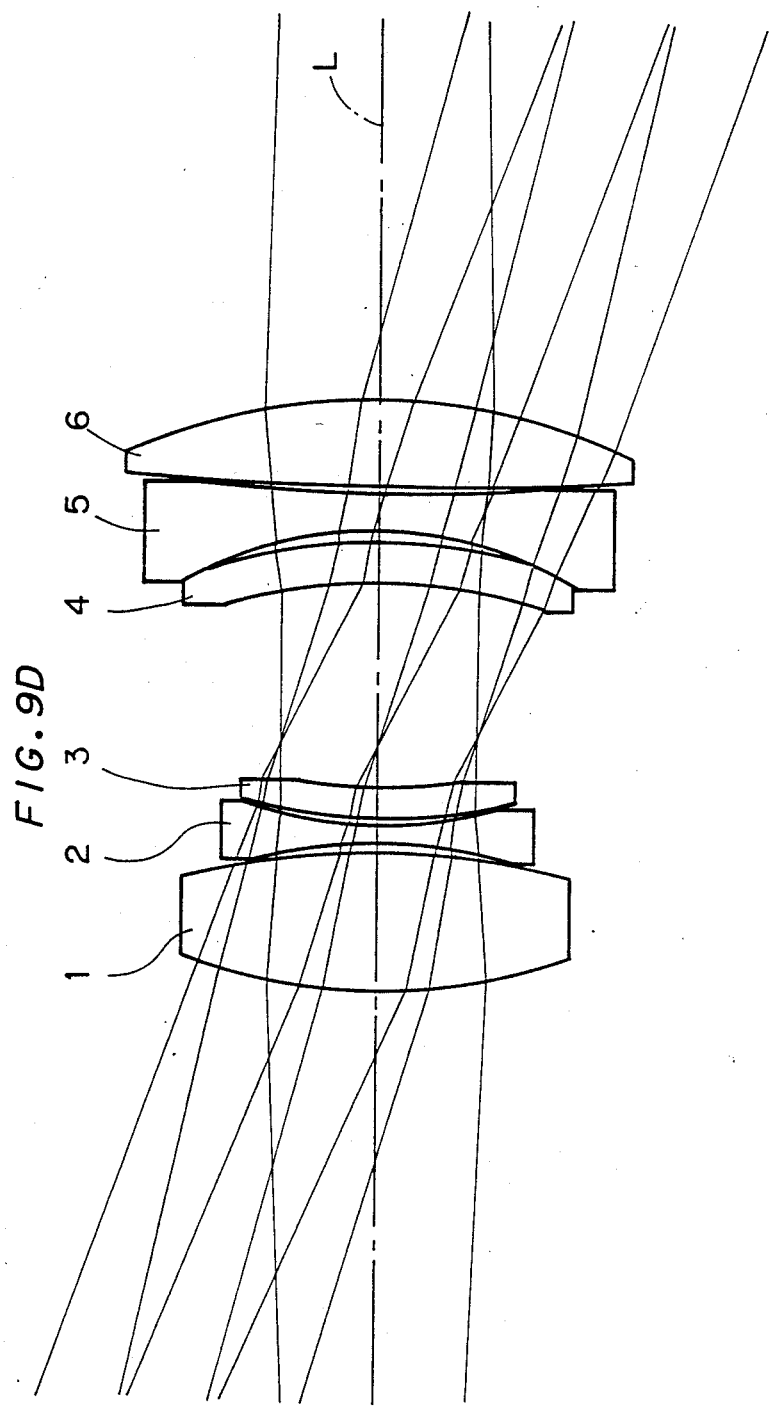

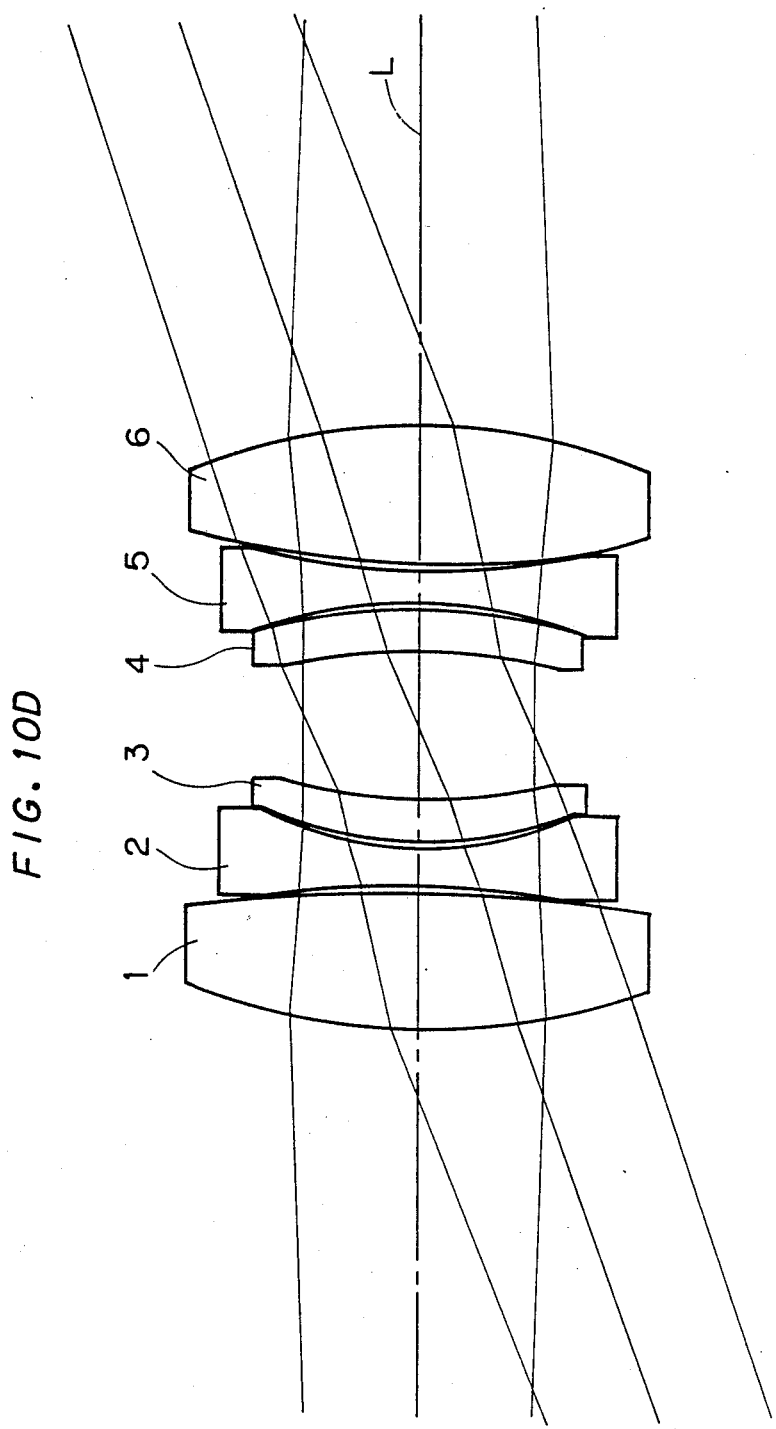

APOCHROMAT OPTICAL SYSTEM

BACKGROUND OF THE INVENTION

1. Field of the Invention

The present invention relates to an apochromat optical system, and more particularly, it relates to an apochromatic lens for a photoengraving process.

2. Description of the Prior Art

It is well known in the art that an apochromatic lens can be formed by combining positive and negative lenses made of glass materials which are different in Abbe's number $\nu$ from each other and equal or substantially equal in partial dispersion ratio P to each other. According to U.S. Patent Application No. 82-419705 filed on Sept. 20, 1982, for example, a lens group including first and second lenses shown in Table 1 performs a function of apochromat.

TABLE 1

|  | first lens | second lens |
| --- | --- | --- |
| name of glass | FK52 | LaK8 |
| $n_d$ | 1.48605 | 1.71300 |
| $\nu_d$ | 81.8 | 53.8 |
| $P_{g,F}$ | 0.538 | 0.545 |
| $\left(=\dfrac{n_g - n_F}{n_F - n_C}\right)$ | $\left(=\dfrac{0.003196}{0.005941}\right)$ | $\left(=\dfrac{0.00721}{0.013245}\right)$ | where symbols $n_d$, $n_g$, $n_F$ and $n_C$ denote indexes of refraction with respect to d-lines, g-lines, F-lines and C-lines, respectively, while symbol $\nu d$ denotes an Abbe's number with respect to the d-lines.

A doublet of the aforementioned apochromatic lens is applied to an objective lens for an astronomical telescope or a collimator lens, in practice.

In the aforementioned combination of the first and second lenses, however, the first lens having a positive power has a low index of refraction and the second lens having a negative power has an index of refraction which is higher than that of the first lens as understood from Table 1, and hence It is difficult to obtain a flat image field. Thus, the aforementioned apochromatic lens cannot be applied to a photographic lens having a wide field angle.

There has been provided a photographic apochromatic lens having a wide field angle, which has the following structure: The photographic apochromatic lens is formed by a stop and first and second lens groups, which include a negative lens made of Kultz flint glass (KzF, KzFS) having an anomalous dispersion value and a positive lens made of glass material being substantially equal in partial dispersion ratio to the Kultz flint glass and higher in index of refraction than the Kultz flint glass, respectively. The first and second lens groups are symmetrically arranged with respect to the stop. For example, optical glass materials for the positive and negative lenses are combined as SK3 and KzF6, SKI6 and KzF1 or LaKN13 and KzFSN4, and partial dispersion ratios $P_{g,F}$ thereof coincide with each other within a range of 0.54 to 0.56.

In the aforementioned structure, however, the Abbe's number of the glass material forming the positive lenses is approximate to that of the glass material forming the negative lenses, and hence radii of curvature of the respective lenses are reduced as compared with focal length of the apochromatic lens, and an F-number is about F9. In order to cause absolutely no vignetting, it is necessary to set the F-number at about F20. Thus, an apochromatic lens having a large aperture ratio cannot be provided.

In the aforementioned structure, further, a sagittal image field is extremely curved and hence astigmatic difference is increased in a peripheral part of an image. In order to solve this problem, it is necessary to set the F-number at F22 to F32. Thus, the aperture ratio of the apochromatic lens is further reduced.

In order to solve the aforementioned problem, there have been proposed means for increasing the index of refraction of a positive lens by combining positive and negative lenses which are relatively approximate in partial dispersion ratio $P_{g,F}$ to each other, as shown in Tables 2 to 4.

TABLE 2

|  | first lens | second lens |
| --- | --- | --- |
| name of glass | LaK08 | KzFSN4 |
| $n_d$ | 1.69350 | 1.61340 |
| $\nu_d$ | 50.8 | 44.3 |
| $P_{g,F}$ | 0.555 | 0.560 |
| $\left(=\dfrac{n_g - n_F}{n_F - n_C}\right)$ | $\left(=\dfrac{0.00757}{0.01365}\right)$ | $\left(=\dfrac{0.00776}{0.01385}\right)$ |

TABLE 3

|  | first lens | second lens |
| --- | --- | --- |
| name of glass | LaFN2 | KzFS5 |
| $n_d$ | 1.74400 | 1.65412 |
| $\nu_d$ | 44.8 | 39.7 |
| $P_{g,F}$ | 0.565 | 0.570 |
| $\left(=\dfrac{n_g - n_F}{n_F - n_C}\right)$ | $\left(=\dfrac{0.00940}{0.01662}\right)$ | $\left(=\dfrac{0.00940}{0.01648}\right)$ |

TABLE 4

|  | first lens | second lens |
| --- | --- | --- |
| name of glass | LaSF07 | KzFS8 |
| $n_d$ | 1.86300 | 1.72047 |
| $\nu_d$ | 41.5 | 34.7 |
| $P_{g,F}$ | 0.567 | 0.582 |
| $\left(=\dfrac{n_g - n_F}{n_F - n_C}\right)$ | $\left(=\dfrac{0.01178}{0.02078}\right)$ | $\left(=\dfrac{0.01208}{0.02075}\right)$ |

Also, there have been proposed means for reducing refractive power of each lens by increasing difference in Abbe's number between positive and negative lenses.

As understood from Tables 2 to 4, partial dispersion values $(n_F - n_C)$ and $(n_g - n_F)$ of the positive lens are approximate to those of the negative lens, respectively, and hence the aforementioned combination of the lenses is suitable as that for a photographic apochromatic lens.

In order to effectuate an apochromatic lens, however, it is necessary to keep difference in Abbe's number between the positive and negative lenses within a constant range. Therefore, when the index of refraction of a positive lens is increased, that of Kurtz flint glass (negative lens) must be also increased and hence flatness cannot be improved as compared with the prior art. In other words, flatness is improved by an increase in the index of refraction of the positive lens, but is deteriorated by an increase in the index of refraction of the negative lens.

Since it is necessary that the negative lens be made of Kurtz flint glass for the aforementioned reason, selection of an optical glass material for the positive lens with respect to the negative lens is limited in a constant range. Therefore, the difference in Abbe's number between positive and negative lenses is limited to a constant range. The aforementioned problem cannot be solved, even if the positive and negative lens are selected so that the difference is maximum.

SUMMARY OF THE INVENTION

The present invention is directed to an apochromat optical system for a photengraving process. According to the present invention, the apochromat optical system comprises: a stop provided along the optical axis of the system; a first lens group including: a first lens having a positive power and having a convex surface which is directed to an object; a second lens made of Kultz Flint glass having an Abbe's number within the range from 45.0 through 34.0, having a negative power and having a concave surface which is directed to an image; and a third lens in the form of meniscus having a positive power and having a convex surface which is directed to the object, which the first through third lenses are successively disposed in order from the object side of the system; and a second lens group including the substantially same configurations of lenses as those in the first lens group. Lenses of the first and second lens groups are approximately symmetrical with respect to the stop and satisfy the following:

$$n_3 > n_2$$
$$1.08 > \{(n_1+n_3)/2\{/n_2\}1.01$$
$$\nu_1 > \nu_2$$
$$\nu_3 > \nu_2$$
$$1.3 > \{(\nu_1+\nu_3)/2\}/\nu_2 > 1.0 \text{ and}$$

where $n_1$, $n_2$ and $n_3$ are a refractive index of the first, second and third lenses, respectively; and $\nu_1$, $\nu_2$ and $\nu_3$ are the Abbe's number of the first, second and third lenses, respectively.

According to a preferred embodiment of the present invention, the second lens group comprises: a fourth lens in the form of meniscus having a positive power and having a convex surface which is directed to the images; a fifth lens made of Kultz Fling glass having an Abbe's number within the range from 45.0 through 34.0, and having a concave surface which is directed to the object; and a sixth lens having a positive power and having a convex surface which is directed to the image. The fourth through sixth lenses are successively disposed in order from the stop, and satisfy the following:

$$n_4 > n_5$$
$$1.08 > \{(n_4+n_6)/2\}/n_5 > 1.01$$
$$\nu_4 > \nu_5$$
$$\nu_6 > \nu_5 \text{ and}$$
$$1.3 > \{(\nu_4+\nu_6)/2\}/\nu_5 > 1.0$$

where $n_4$, $n_5$ and $n_6$ are a refractive index of the fourth, fifth and sixth lenses, respectively; and $\nu_4$, $\nu_5$ and $\nu_6$ are the Abbe's number of the fourth, fifth and sixth lenses, respectively.

The present invention is directed to an apparatus for color reproduction, too. According to an aspect of the present invention, the apparatus for color reproduction comprises: a light source for illuminating an original to be reproduced; an original holder for holding a color original thereon; photosensitive means for reproducing an image of the original upon receiving light from the original to be reproduced; and an optical system of apochromat disposed optically between the original holder and the photosensitive means. The optical system comprises: a stop provided along the optical axis of the apparatus, a first lens group including: a first lens having a positive power and having a convex surface which is directed to the original; a second lens made of Kultz Flint glass having an Abbe's number Within the range from 45.0 through 34.0, having a negative power and having a concave surface which is directed to the photosensitive means; and a third lens in the form of meniscus having a positive power and having a convex surface which is directed to the original, Which the firs& through third lenses being successively disposed in order from the original side of the optical system; and a second lens group including substantially the same configurations of lenses as those in the first lens group. Lenses of the first and second lens groups are approximately symmetrical with respect to the stop, and satisfy the following:

$$n_3 > n_2$$
$$1.08 > \{(n_1+n_3)/2\}/n_2 > 1.01$$
$$\nu_1 > \nu_2$$
$$\nu_3 > \nu_2$$
$$1.3 > \{(\nu_1+\nu_3)/2\}/\nu_2 > 1.0 \text{ and}$$

where $n_1$, $n_2$ and $n_3$ are a refractive index of the first, second and third lenses, respectively; and $\nu_1$, $\nu_2$ and $\nu_3$ are the Abbe's numbers of the first, second and third lenses, respectively.

Accordingly, a principal object of the present invention is to propose an apochromat optical system having a high aperture ratio and small curvature of the saggital image field, which can reduce astigmatic difference in a peripheral part of an image.

Another object of the present invention is to provide an apparatus for color reproduction which can perform clearer reproduction through the aforementioned apochromatic lens.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2A, 3A, 4A, 5A, 6A, 7A, 8A, 9A and 10A illustrate spherical aberration values of apochromat optical system according to Examples 1 to 9, respectively;

FIGS. 2B, 3B, 4B, 5B, 6B, 7B, 8B, 9B and 10B illustrate astigmatism values of the apochromat optical system according to Examples 1 to 9, respectively;

FIGS. 2C, 3C, 4C. 5C, 6C, 7C, 8C, 9C and 10C illustrate distortion aberration values of the apochromat optical system according to Examples 1 to 9, respectively;

FIGS. 2D, 3D, 4D, 5D, 6D, 7D, 8D, 9D and 10D illustrate optical paths of light directed from object sides to image in the apochromat optical system according to Examples 1 to 9, respectively;

DESCRIPTION OF THE PREFERRED EMBODIMENTS

Figure 1:
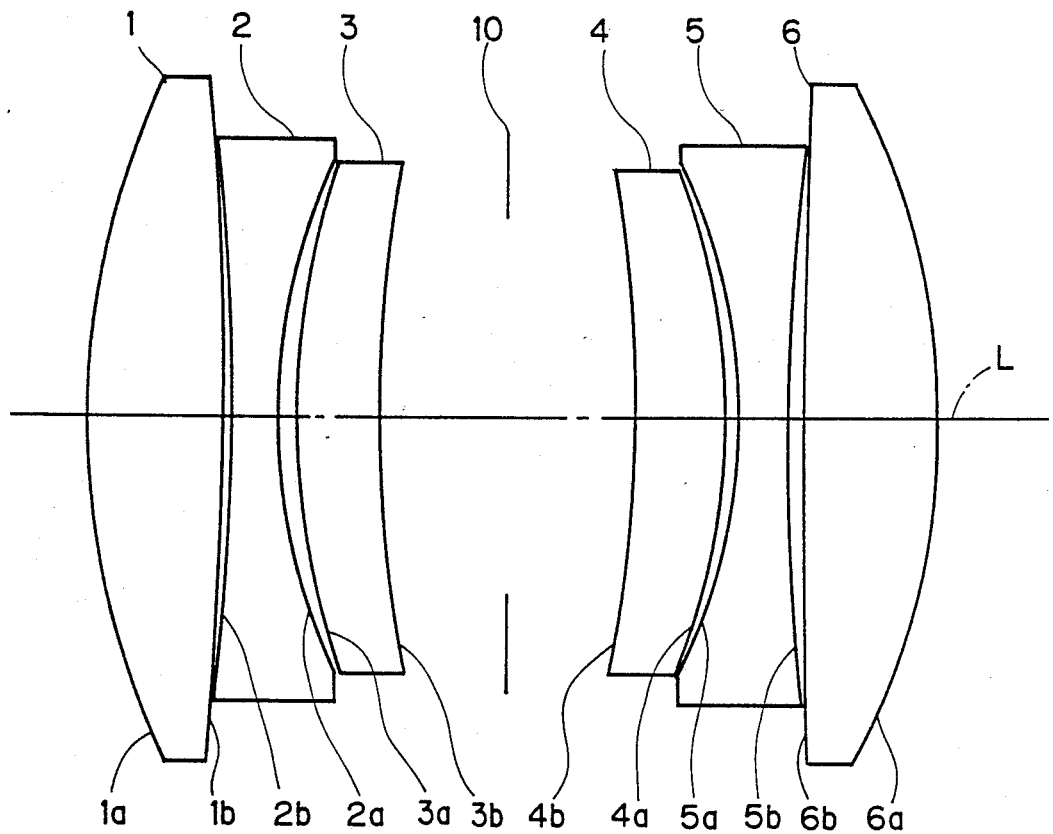
FIG. 1 is a block diagram showing an embodiment of an apochromat optical system according to the present invention.

FIG. 1 is a block diagram showing an embodiment of an apochromat optical system according to the present invention. As shown in FIG. 1, the apochromat optical system is formed by a positive lens 1 having a positive power (hereinafter referred to as "first lens") whose convex surface 1a is directed to an object side (left-hand side in the figure), a negative lens 2 having a negative power (hereinafter referred to as "second lens") which is adjacent to the first lens 1 and has a concave surface 2a directed toward a stop 10, a positive lens 3 in the form of meniscus having a positive power (hereinafter referred to as "third lens") which is adjacent to the second lens 2 and has a convex surface 3a directed to the object side, a positive lens 4 in the form of meniscus having a positive power (hereinafter referred to as "fourth lens") which is opposed to the third lens 3 through the stop 10 and has a convex surface 4a directed to an image-formation side (righthand direction in the figure), a negative lens 5 having a negative power (hereinafter referred to as "fifth lens") which is adjacent to the fourth lens 4 and has a concave surface 5a directed toward the stop 10, and a positive lens 6 having a positive power (hereinafter referred to as "sixth lens") which is adjacent to the fifth lens 5 and has a convex surface 6a directed to the image-formation side.

The first to sixth lenses 1 to 6 satisfy the following conditions:

Condition 1

$$\left.\begin{array}{l}\{(n_1 + n_3)/2\}/n_2 > 1.01 \\ \{(n_4 + n_6)/2\}/n_5 > 1.01\end{array}\right\} \quad \ldots (1)$$

Condition 2

$$\left.\begin{array}{l}\{(\nu_1 + \nu_3)/2\}/\nu_2 > 1.0 \\ \{(\nu_4 + \nu_6)/2\}/\nu_5 > 1.0\end{array}\right\} \quad \ldots (2)$$

Condition 3

$$\left.\begin{array}{l}\{(n_1 + n_3)/2\}/n_2 < 1.08 \\ \{(n_4 + n_6)/2\}/n_5 < 1.08\end{array}\right\} \quad \ldots (3)$$

Condition 4

$$\left.\begin{array}{l}\{(\nu_1 + \nu_3)/2\}/\nu_2 < 1.3 \\ \{(\nu_4 + \nu_6)/2\}/\nu_5 < 1.3\end{array}\right\} \quad \ldots (4)$$

Condition 5

$$\left.\begin{array}{l}n_3 > n_2 \\ n_4 > n_5\end{array}\right\} \quad \ldots (5)$$

Condition 6

$$\left.\begin{array}{l}\nu_1 > \nu_2 \; \nu_2 < \nu_3 \\ \nu_4 > \nu_5 \; \nu_5 < \nu_6\end{array}\right\} \quad \ldots (6)$$

A condition 7 is that the second and fifth lenses 2 and 5 are made of Kurtz flint glass, which satisfy:

$$\left.\begin{array}{l}45.0 > \nu_2 > 34.0 \\ 45.0 > \nu_5 > 34.0\end{array}\right\} \quad \ldots (7)$$

Symbols $n_1$, $n_2$, $n_3$, $n_4$, $n_5$ and $n_6$ denote indexes of refraction of the first to sixth lenses 1 to 6, respectively, while symbols $\nu_1$, $\nu_2$, $\nu_3$, $\nu_4$, $\nu_5$ and $\nu_6$ denote Abbe's numbers of the first to sixth lenses 1 to 6, respectively.

An average index of refraction $\{(n_1+n_3)/2\}$ of the positive lenses 1 and 3 and an average index of refraction $\{n_4+n_6)/2\}$ of the positive lenses 4 and 6 must be greater than indexes of refraction $n_2$ and $n_5$ of the negative lenses 2 and 5, respectively. The refractive index ratio of the average index of refraction of the positive lenses 1 and 3 to the index of refraction of the negative lens 2 and the refractive index ratio of the average index of refraction of the positive lenses 4 and 6 to the index of refraction of the negative lens 5, are set to be greater than 1.01 and less than 1.08, as shown in the expressions (1) and (3). This is because flatness of the image field cannot be maintained if the refractive index ratios are less than 1.01. If the refractive index ratios are greater than 1.08, on the other hand, the indexes of refraction of the third and fourth lenses 3 and 4 exceed those of the second and fifth lenses 2 and 5, respectively, while the Abbe's number of a glass material having a high index of refraction is inevitably small, and hence an average Abbe's number $\{(\nu_1+\nu_3)/2\}$ of the positive lenses 1 and 3 and an average Abbe's number $\{(\nu_4+\nu_6)/2\}$ of the positive lenses 4 and 6 are less than the Abbe's numbers $\nu_2$ and $\nu_5$ of the negative lenses 2 and 5, respectively. Thus, the expression (2) is not satisfied.

Further, the average Abbe's number $\{(\nu_1+\nu_3)/2\}$ of the positive lenses 1 and 3 and the average Abbe's number $\{(\nu_4+\nu_6)/2\}$ of the positive lenses 4 and 6 must be greater than the Abbe's numbers $\nu_2$ and $\nu_5$ of the negative lenses 2 and 5, so that the optical system having the structure shown in FIG. 1 performs as an apochromatic lens. This is because, if the expression (2) is not satisfied, the first to sixth lenses 1 to 6 are so increased in refractive power that aberration values of the respective lenses 1 to 6 cannot be precisely maintained. As shown in the expression (4), an Abbe's number ratio of an average Abbe's number of the positive lenses 1 and 3 to the Abbe's number of the negative lens 2 and an Abbe's number ratio of an average Abbe's number of the positive lenses 4 and 6 to the Abbe's number of the negative lens 5 are set to be less than 1.3, respectively If the Abbe's number ratios exceed 1.3, the Abbe's numbers of the first, third, fourth and sixth lenses 1, 3, 4 and 6 are respectively increased, while there is only glass material having a low index of refraction in glass materials having a large Abbe's number. Thus, the expression (1) is not satisfied. Therefore, it is substantially necessary to set the aforementioned Abbe's number ratios to be less than 1.3.

When the glass materials have the same index is of refraction, the one having the largest Abbe's number significantly differs in partial dispersion ratio from Kurtz flint glass which makes a negative lens. Therefore, a secondary spectrum increases.

The theory of preparing an apochromat optical system by combining glass materials which are equal in partial dispersion ratio to each other in geometrical optics is restricted to a paraxial region, and cannot be directly applied to an actual lens having an effective aperture, a field angle and the like. This is because the amount of spherical aberration and the configuration of an average image field are generally affected by wavelengths. If the amount of aberration of an apochromat optical system is largely varied with the respective wavelengths and the paraxial chromatic aberration on an axis is zero, chromatic aberration of zonal rays (practical rays out of paraxial rays) and misregistration of an average image field in a peripheral part of an image may be rather increased. In an actual lens system, it is more important to remove the difference in the secondary spectrum of zonal rays and the difference in the image field caused by respective colors in the peripheral part of the image, as compared with the the amount of paraxial chromatic aberration on an axis.

In a photographic lens of an ordinary type, an average image field of short wavelength light curves in a plus direction and an average image field of long wavelength light curves in a minus direction with respect to an average image field of reference rays. In order, therefore, to match these image fields in a peripheral part of an image, an axial image point of the short wavelength light may be corrected in the minus direction and an axial image point of the long wavelength light may be corrected in the plus direction, respectively. Namely, it is necessary to leave chromatic aberration corresponding to the difference between peripheral image fields without completely matching paraxial image points on the axis. It may be noted that aforemetioned lens system does not perform as an apochromatic lens.

However, practical axial image points are not generated by paraxial rays, but by circles of least confusion including spherical. Therefore, even if paraxial image points are varied with respective wavelengths, practical image points can be matched with respect to three wavelengths by following spherical aberration of short wavelength light curves in a plus side as compared with that of reference wavelength light and spherical aberration of long wavelength light curves in a minus side as compared with that of the reference wavelength light so that spherical aberration values of zonal rays can be matched.

Therefore, it is necessary to strcture the apochromat optical system so that the index of refraction $n_3$ of the third lens 3 is higher than the index of refraction $n_2$ of the second lens 2 and the index of refraction $n_4$ of the fourth lens 4 is higher than the index of refraction $n_5$ of the fifth lens 5.

EXAMPLE 1

Figures 2A, 2B, 2C:
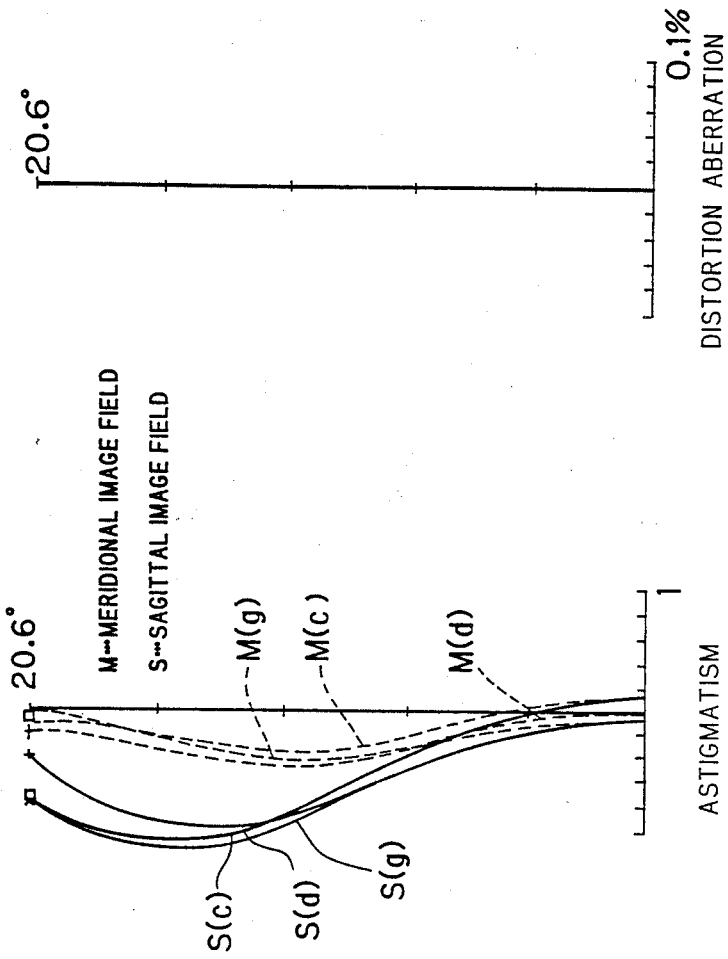
Figure 2D:
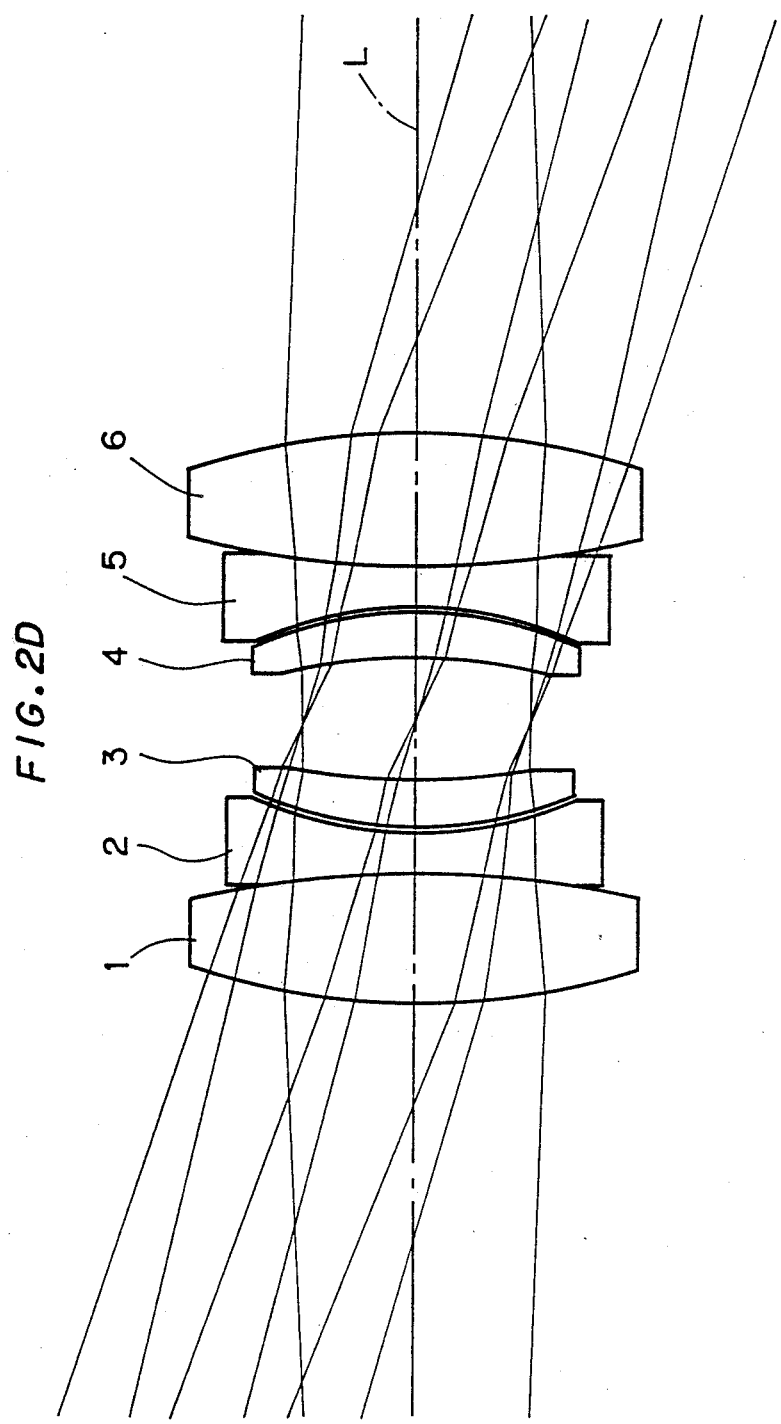

First to sixth lenses 1 to 6 shown in Table 5 are combined in the aforementioned manner, to form an apochromatic lens (see FIG. 2D).

TABLE 5

|  | 1st,6th lens | 2nd,5th lens | 3rd,4th lens |
|---|---|---|---|
| name of glass | LaK06 | KzFS4 | LaK08 |
| $n_d$ | 1.67790 | 1.61340 | 1.69350 |
| $v_d$ | 50.7 | 43.8 | 50.8 |
| $P_{g,F}$ | 0.5566 | 0.5625 | 0.5551 |

The focal length f, the total field angle $2\theta$, the F-number F and the magnification M of this apochromatic lens are respectively set as shown in Table 6.

TABLE 6

| focal length f | 100 |
|---|---|
| total field angle $2\theta$ | 41.2° |
| F-number F | 7.5 |
| magnification M | 1 |

The radius of curvature $R_1$ of a convex surface 1a of the first lens 1 directed to an object side and the radius of curvature $R_2$ of a surface 1b directed toward a stop are respectively set as follows:

$R_1 = 33.232$ $R_2 = -51.239$

The radius of curvature $R_3$ of a surface 2b of the second lens 2 directed to the object side and the radius of curvature $R_4$ of a concave surface 2a directed toward the stop are respectively set as follows:

$R_3 = -45.838$ $R_4 = 18.328$

The radius of curvature $R_5$ of a convex surface 3a of the third lens 3 directed to the object side and the radius of curvature $R_6$ of a surface 3b directed toward the stop are respectively set as follows:

$R_5 = 19.406$ $R_6 = 36.040$

The radius of curvature $R_7$ of a surface 4b of the fourth lens 4 directed toward the stop and the radius of curvature $R_8$ of a convex surface 4a directed to an imageformation side are respectively set as follows:

$R_7 = -36.040$ $R_8 = -19.406$

The radius of curvature $R_9$ of a concave surface 5a of the fifth lens 5 directed toward the stop and the radius of curvature $R_{10}$ of a surface 5b directed to the imageformation side are respectively set as follows:

$R_9 = -18.328$ $R_{10} = 45.838$

The radius of curvature $R_{11}$ of a surface 6b of the sixth lens 6 directed toward the stop and the radius of curvature $R_{12}$ of a convex surface 6a directed to the imageformation side are respectively set as follows:

$R_{11} = 51.239$ $R_{12} = -33.232$

Further, thickness $d_1$ of the first lens 1 and spacing $d_{12}$ between the first and second lenses 2 on an optical axis L (FIG. 2D) are respectively set as follows:

$d_1 = 6.39$ $d_{12} = 0.38$

Thickness $d_2$ of the second lens 2 and spacing $d_{23}$ between the second and third lenses 2 and 3 on the optical axis L are respectively set as follows:

$d_2 = 1.60$ $d_{23} = 0.10$

Thickness $d_3$ of the third lens 3 and spacing $d_{34}$ between the third and fourth lenses 3 and 4 on the optical axis L are respectively set as follows:

$d_3 = 2.36$ $d_{34}=5.96$

Thickness $d_4$ of the fourth lens 4 and spacing $d_{45}$ between the fourth and fifth lenses 4 and 5 on the optical axis L are respectively set as follows:

$d_4=2.36$ $d_{45}=0.10$

Thickness $d_5$ of the fifth lens 5, spacing $d_{56}$ between the fifth and sixth lenses 5 and 6 on the optical axis L and thickness $d_6$ of the sixth lens 6 are respectively set as follows:

$d_5=1.60$, $d_{56}=0.38$, $d_6=6.39$

All of the radii of curvature $R_1$ to $R_{12}$, the thickness values $d_1$ to $d_6$, spacing values $d_{12}$ to $d_{56}$ and the focal length $f$ are in units of millimeters. This also applies to the following description.

FIGS. 2A, 2B, 2C and 2D illustrate spherical aberration, astigmatism and distortion aberration of the apochromatic lens having the aforementioned structure and optical paths of light directed from the object side to the image-formation side, respectively. The results shown in FIGS. 2A to 2D have been obtained through computer simulation on the basis of the above data.

Referring to FIG. 2A, the horizontal axis represents aberration values and the vertical axis represents F numbers. Referring to FIG. 2B, the horizontal axis represent aberration values and the vertical axis represents the field angles. Solid lines in FIG. 2B show astigmatism values of sagital image fields, and dotted lines show values of meridional image fields. Referring to FIG. 2C, the horizontal axis represent aberration values and the vertical axis represents the field angles.

Referring to FIGS. 2A and a 2B, symbols c, d and g denote simulation results as to lines c, d and g, respectively.

In the following Examples 2 to 9, lens data etc. are shown through only the aforementioned symbols, and description thereof is omitted.

EXAMPLE 2

Figure 3D:
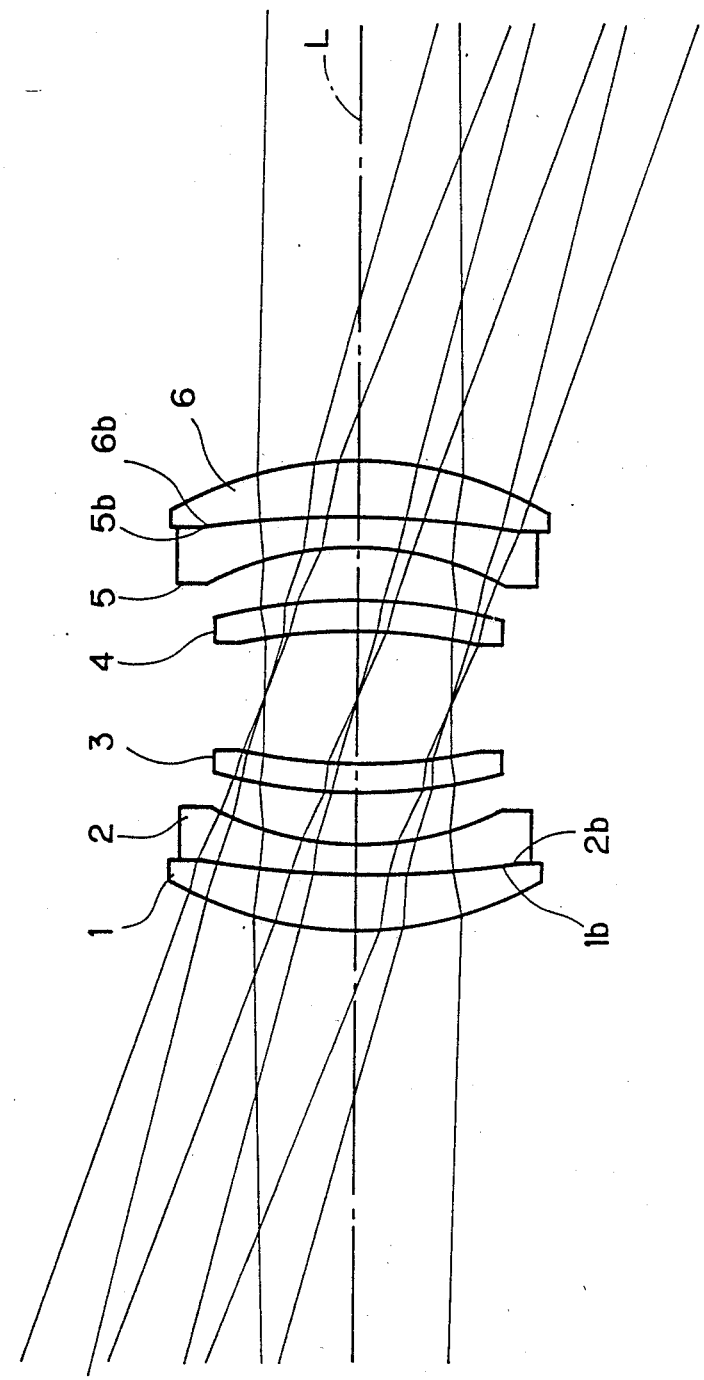

First to sixth lens 1 to 6 shown in Table 7 are combined in the aforementioned manner, to form an apochromatic lens (see FIG. 3D).

TABLE 7

|  | 1st,6th lens | 2nd,5th lens | 3rd,4th lens |
|---|---|---|---|
| name of glass | SK18 | KzFS4 | LaF3 |
| $n_d$ | 1.63854 | 1.61340 | 1.71700 |
| $\nu_d$ | 55.4 | 43.8 | 47.9 |
| $P_{g,F}$ | 0.5500 | 0.5625 | 0.5604 |

The focal length $f$, the total field angle $2\theta$, the F-number F and the magnification M of this apochromatic lens are respectively set as shown in Table 8.

TABLE 8

| focal length f | 100 |
|---|---|
| total field angle $2\theta$ | 41.0° |
| F-number F | 12.3 |
| magnification M | 1 |

Radii of curvature $R_1$ to $R_{12}$, the thickness values $d_1$ to $d_6$ and lens spacing values $d_{12}$ to $d_{56}$ of the first to sixth lenses 1 to 6 are respectively set as shown in Table 9.

TABLE 9

| radius of curvature | thickness of lens | spacing |
|---|---|---|
| $R_1 = 14.486$ | | |
| | $d_1 = 1.97$ | |
| $R_2 = 45.761$ | | |
| | | $d_{12} = 0$ |
| $R_3 = 45.761$ | | |
| | $d_2 = 1.09$ | |
| $R_4 = 12.427$ | | |
| | | $d_{23} = 1.87$ |
| $R_5 = 20.701$ | | |
| | $d_3 = 1.17$ | |
| $R_6 = 26.321$ | | |
| | | $d_{34} = 4.72$ |
| $R_7 = -26.321$ | | |
| | $d_4 = 1.17$ | |
| $R_8 = -20.701$ | | |
| | | $d_{45} = 1.87$ |
| $R_9 = -12.427$ | | |
| | $d_5 = 1.09$ | |
| $R_{10} = -45.761$ | | |
| | | $d_{56} = 0$ |
| $R_{11} = -45.761$ | | |
| | $d_6 = 1.97$ | |
| $R_{12} = -14.486$ | | |

As understood from Table 9, the radii of curvature $R_2$ and $R_3$ of surfaces 1b and 2b of the first and second lenses 1 and 2 are equal to each other and the radii of curvature $R_{10}$ and $R_{11}$ of surfaces 5b and 6b of the fifth and sixth lenses 5 and 6 are equal to each other, while the first lens 1 is adhered to the second lens 2 and the fifth lens 5 is adhered to the sixth lens 6 (spacing $d_{12}=0$ and $d_{56}=0$).

Results shown in FIGS. 3A, 3B, 3C and 3D have been obtained through computer simulation on the basis of the above data. FIGS. 3A, 3B, 3C and 3D illustrate spherical aberration, astigmatism and distortion aberration of this apochromatic lens and optical paths of light directed from an object side to an image-formation side, respectively

EXAMPLE 3

Figure 4C:
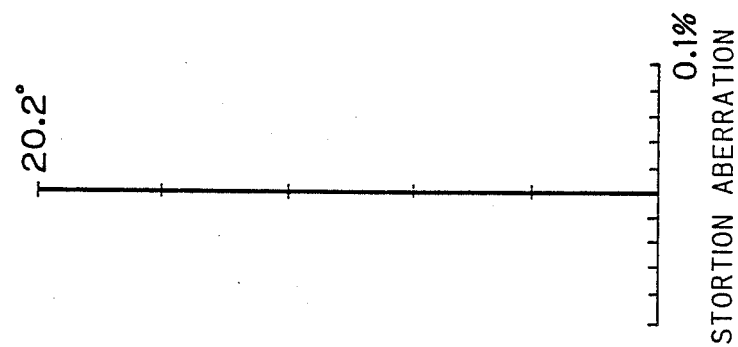
Figure 4B:
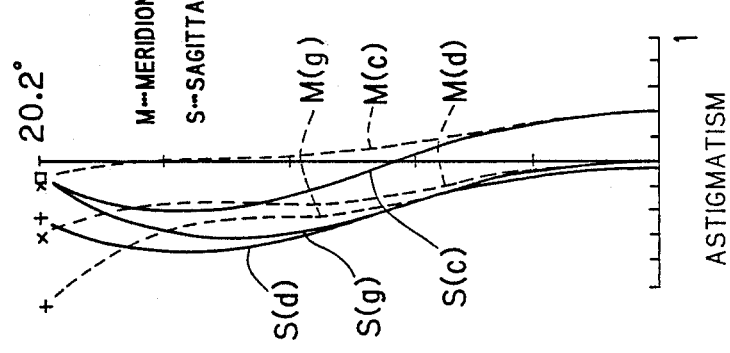
Figure 4A:
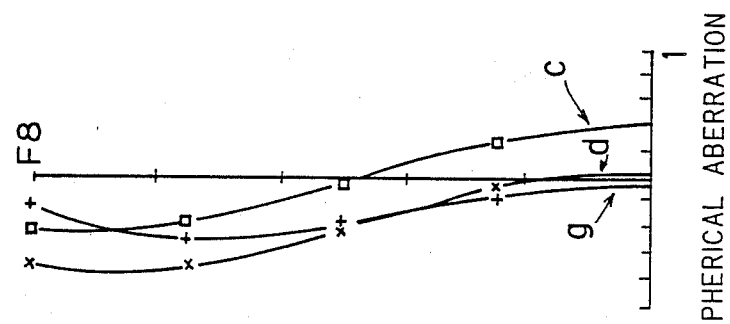

First to sixth lenses I to 6 shown in Table 10 are combined in the aforementioned manner, to form an apochromatic lens (see FIG. 4D).

TABLE 10

|  | 1st,6th lens | 2nd,5th lens | 3rd,4th lens |
|---|---|---|---|
| name of glass | LaSF010 | KzFS8 | LaSF07 |
| $n_d$ | 1.83400 | 1.72047 | 1.86300 |
| $\nu_d$ | 37.2 | 34.7 | 41.5 |
| $P_{g,F}$ | 0.5774 | 0.5821 | 0.5669 |

The focal length of $f$, the total field angle $2\theta$, the F-number F and the magnification M of this apochromatic lens are respectively set as shown in Table 11.

TABLE 11

| focal length f | 100 |
|---|---|
| total field angle $2\theta$ | 40.4° |
| F-number F | 8 |
| magnification M | 1 |

Radii of curvature $R_1$ to $R_{12}$, thickness values $d_1$ to $d_6$ and lens spacing values $d_{12}$ to $d_{56}$ of the first to sixth lenses 1 to 6 are respectively set as shown in Table 12.

TABLE 12

| radius of curvature | thickness of lens | spacing |
|---|---|---|
| $R_1 = 57.586$ | | |
| | $d_1 = 6.49$ | |
| $R_2 = -128.009$ | | |
| | | $d_{12} = 0.85$ |
| $R_3 = -111.742$ | | |
| | $d_2 = 1.32$ | |
| $R_4 = 17.920$ | | |
| | | $d_{23} = 0.15$ |
| $R_5 = 18.686$ | | |
| | $d_3 = 3.25$ | |
| $R_6 = 53.840$ | | |
| | | $d_{34} = 21.72$ |
| $R_7 = -53.840$ | | |
| | $d_4 = 3.25$ | |
| $R_8 = -18.686$ | | |
| | | $d_{45} = 0.15$ |
| $R_9 = -17.920$ | | |
| | $d_5 = 1.32$ | |
| $R_{10} = 111.742$ | | |
| | | $d_{56} = 0.85$ |
| $R_{11} = 128.009$ | | |
| | $d_6 = 6.49$ | |
| $R_{12} = -57.586$ | | |

Results shown in FIGS. 4A, 4B, 4C and 4D have been obtained through computer simulation on the basis of the above data. FIGS. 4A, 4B, 4C and 4D illustrate spherical aberration, astigmatism and distortion aberration of this apochromatic lens and optical paths of light directed from an object side to an image-formation side, respectively.

EXAMPLE 4

First to sixth lenses 1 to 6 shown in Table 13 are combined in the aforementioned manner, to form an apochromatic lens (see FIG. 5D).

TABLE 13

| | 1st,6th lens | 2nd,5th lens | 3rd,4th lens |
|---|---|---|---|
| name of glass | LaSF013 | KzFS8 | LaSF07 |
| $n_d$ | 1.80440 | 1.72047 | 1.86300 |
| $v_d$ | 39.6 | 34.7 | 41.5 |
| $P_{g,F}$ | 0.5728 | 0.5821 | 0.5669 |

The focal length f, the total field angle $2\theta$, the F-number F and the magnification M of this apochromatic lens are respectively set as shown in Table 14.

TABLE 14

| focal length f | 100 |
|---|---|
| total field angle $2\theta$ | 40.4° |
| F-number F | 8 |
| magnification M | 1 |

Radii of curvature $R_1$ to $R_{12}$, lens thickness values $d_1$ to $d_6$ and lens spacing values $d_{12}$ and $d_{56}$ of the first to sixth lenses 1 to 6 are respectively set as shown in Table 15.

TABLE 15

| radius of curvature | thickness of lens | spacing |
|---|---|---|
| $R_1 = 35.105$ | | |
| | $d_1 = 4.66$ | |
| $R_2 = -81.831$ | | |
| | | $d_{12} = 0.18$ |
| $R_3 = -76.521$ | | |
| | $d_2 = 1.50$ | |
| $R_4 = 20.330$ | | |
| | | $d_{23} = 0.27$ |
| $R_5 = 22.234$ | | |
| | $d_3 = 2.64$ | |
| $R_6 = 37.249$ | | |

TABLE 15-continued

| radius of curvature | thickness of lens | spacing |
|---|---|---|
| | | $d_{34} = 22.20$ |
| $R_7 = -37.249$ | | |
| | $d_4 = 2.64$ | |
| $R_8 = -22.234$ | | |
| | | $d_{45} = 0.27$ |
| $R_9 = -20.330$ | | |
| | $d_5 = 1.50$ | |
| $R_{10} = 76.521$ | | |
| | | $d_{56} = 0.18$ |
| $R_{11} = 81.831$ | | |
| | $d_6 = 4.66$ | |
| $R_{12} = -35.105$ | | |

Results shown in FIGS. 5A, 5B, 5C and 5D have been obtained through computer simulation on the basis of the above data. FIGS. 5A, 5B, 5C and 5D illustrate spherical aberration, astigmatism and distortion aberration of this apochromatic lens and optical paths of light directed from an object side to an image-formation side, respectively.

EXAMPLE 5

Figure 6C:
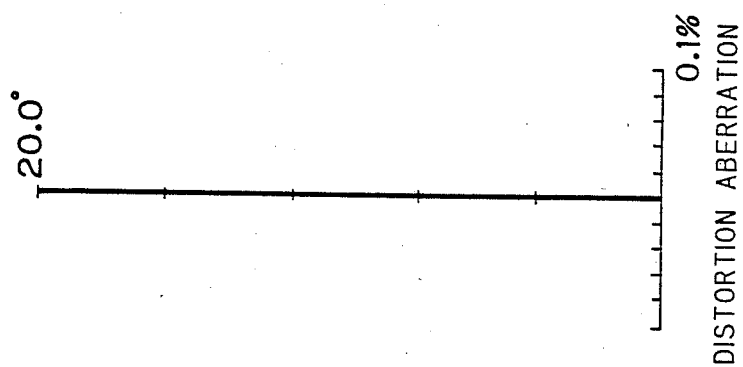
Figure 6B:
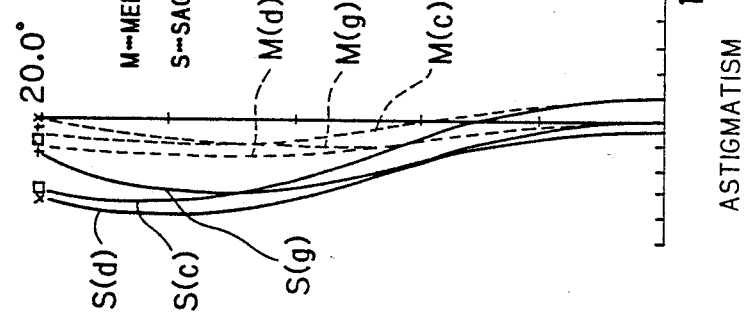
Figure 6A:
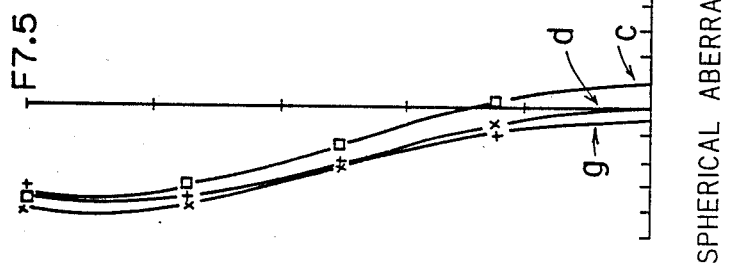

First to sixth lenses 1 to 6 shown in Table 16 are combined in the aforementioned manner, to form an apochromatic lens (see FIG. 6D).

TABLE 16

| | 1st,6th lens | 2nd,5th lens | 3rd,4th lens |
|---|---|---|---|
| name of glass | LaF01 | KzFS5 | LaF011 |
| $n_d$ | 1.7000 | 1.65412 | 1.72000 |
| $v_d$ | 48.1 | 39.7 | 46.0 |
| $P_{g,F}$ | 0.5621 | 0.5703 | 0.5646 |

The focal length f, the total field angle $2\theta$, the F-number F and the magnification M of this apochromatic lens are respectively set as shown in Table 17.

TABLE 17

| focal length f | 100 |
|---|---|
| total field angle $2\theta$ | 40° |
| F-number F | 7.5 |
| magnification M | 1 |

Radii of curvature $R_1$ to $R_{12}$, lens thickness values $d_1$ to $d_6$ and lens spacing values $d_{12}$ to $d_{56}$ of the first to sixth lenses 1 to 6 are respectively set as shown in Table 18.

TABLE 18

| radius of curvature | thickness of lens | spacing |
|---|---|---|
| $R_1 = 23.998$ | | |
| | $d_1 = 4.45$ | |
| $R_2 = -124.758$ | | |
| | | $d_{12} = 0.27$ |
| $R_3 = -116.169$ | | |
| | $d_2 = 1.60$ | |
| $R_4 = 18.670$ | | |
| | | $d_{23} = 0.77$ |
| $R_5 = 26.639$ | | |
| | $d_3 = 2.74$ | |
| $R_6 = 38.117$ | | |
| | | $d_{34} = 8.40$ |
| $R_7 = -38.117$ | | |
| | $d_4 = 2.74$ | |
| $R_8 = -26.639$ | | |
| | | $d_{45} = 0.77$ |
| $R_9 = -18.670$ | | |
| | $d_5 = 1.60$ | |
| $R_{10} = 116.169$ | | |
| | | $d_{56} = 0.27$ |
| $R_{11} = 124.758$ | | |
| | $d_6 = 4.45$ | |

TABLE 18-continued

| radius of curvature | thickness of lens | spacing |
|---|---|---|
| $R_{12} = -23.998$ | | |

Results shown in FIGs. 6A, 6B, 6C and 6D have been obtained through computer simulation on the basis of the above data. FIGS. 6A, 6B, 6C and 6D illustrate spherical aberration, astigmatism and distortion aberration of this apochromatic lens and optical paths of light directed from an object side to an image-formation side respectively.

EXAMPLE 6

Figure 7C:
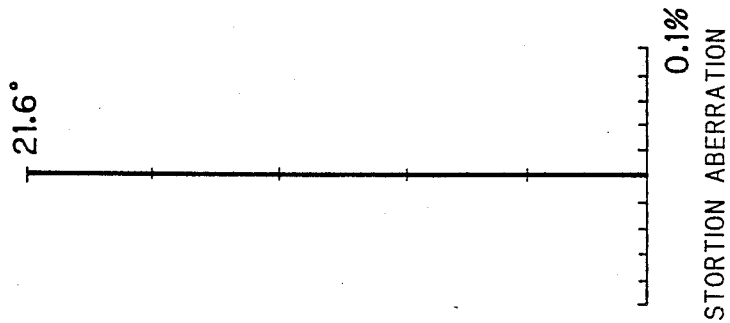
Figure 7B:
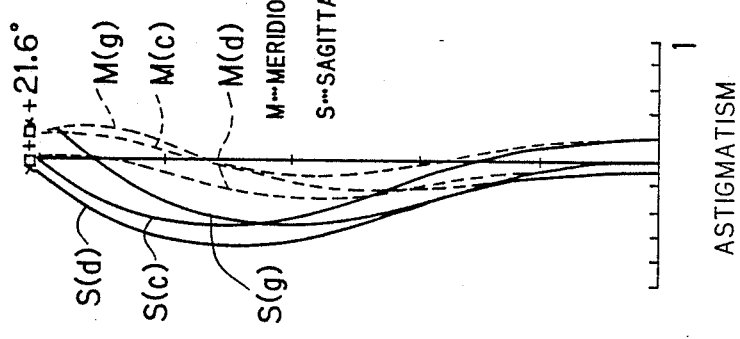
Figure 7A:
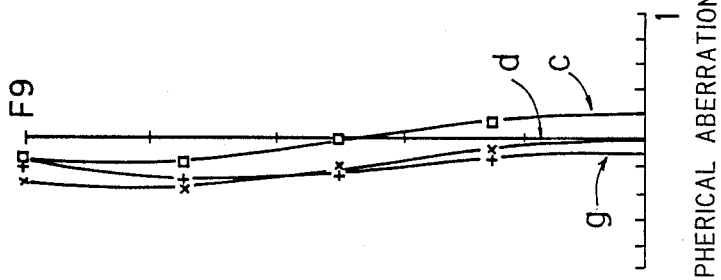
Figure 7D:
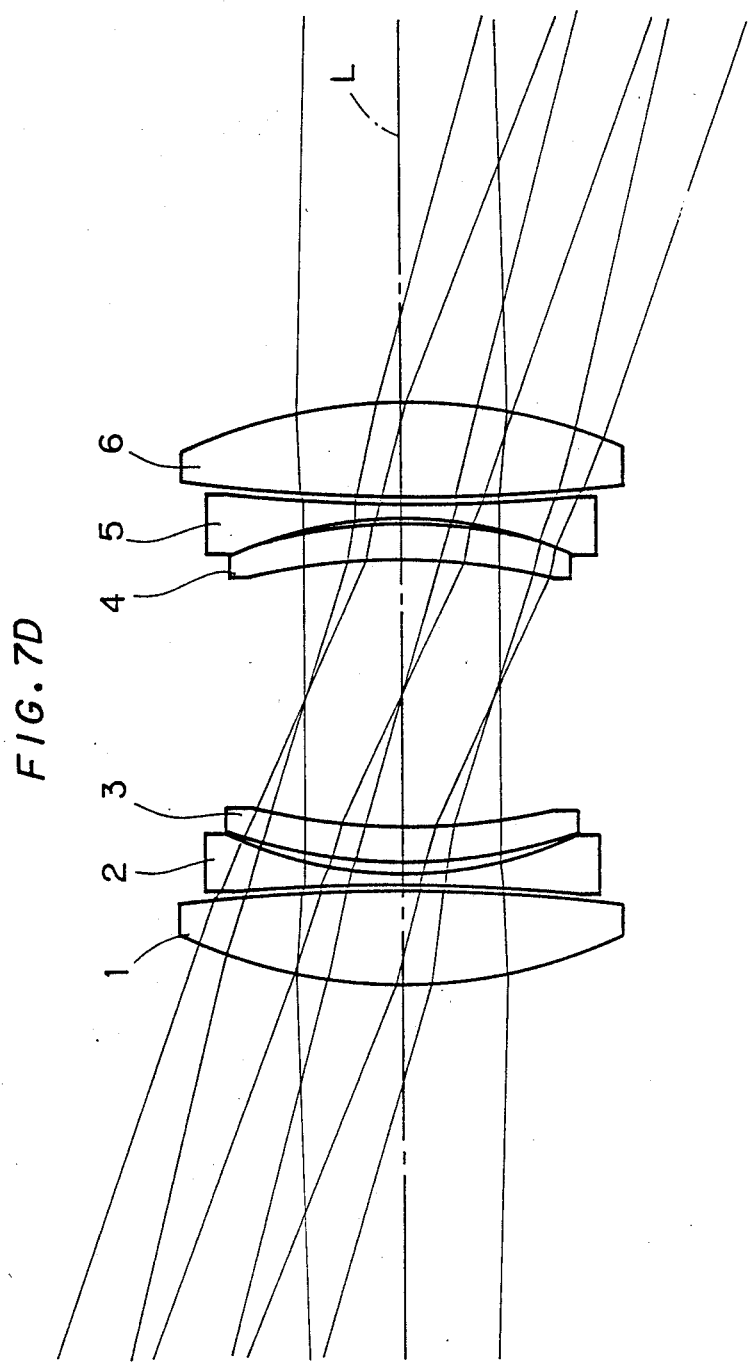

First to sixth lenses 1 to 6 shown in Table 19 are combined in the aforementioned manner, to form an apochromatic lens (see FIG. 7D).

TABLE 19

| | 1st, 6th lens | 2nd, 5th lens | 3rd, 4th lens |
|---|---|---|---|
| name of glass | LaF3 | KzFS5 | LaF2 |
| $n_d$ | 1.71700 | 1.65412 | 1.74400 |
| $v_d$ | 47.9 | 39.7 | 44.8 |
| $P_{g,F}$ | 0.5604 | 0.5703 | 0.5654 |

The focal length f, the total field angle $2\theta$, the F-number F and the magnification M of this apochromatic lens are respectively set as shown in Table 20.

TABLE 20

| focal length f | 100 |
|---|---|
| total field angle $2\theta$ | 43.2° |
| F-number F | 9 |
| magnification M | 1 |

Radii of curvature $R_1$ to $R_{12}$, lens thickness values $d_1$ to $d_6$ and lens spacing values $d_{12}$ to $d_{56}$ of the first to sixth lenses 1 to 6 are respectively set as shown in Table 21.

TABLE 21

| radius of curvature | thickness of lens | spacing |
|---|---|---|
| $R_1 = 23.840$ | | |
| | $d_1 = 4.46$ | |
| $R_2 = -133.188$ | | |
| | | $d_{12} = 0.39$ |
| $R_3 = -111.538$ | | |
| | $d_2 = 0.60$ | |
| $R_4 = 18.510$ | | |
| | | $d_{23} = 0.496708$ |
| $R_5 = 25.228$ | | |
| | $d_3 = 1.57$ | |
| $R_6 = 35.194$ | | |
| | | $d_{34} = 12.92$ |
| $R_7 = -35.194$ | | |
| | $d_4 = 1.57$ | |
| $R_8 = -25.228$ | | |
| | | $d_{45} = 0.496708$ |
| $R_9 = -18.510$ | | |
| | $d_5 = 0.60$ | |
| $R_{10} = 111.538$ | | |
| | | $d_{56} = 0.39$ |
| $R_{11} = 133.188$ | | |
| | $d_6 = 4.46$ | |
| $R_{12} = -23.840$ | | |

Results shown in FIGS. 7A, 7B, 7C and 7D have been obtained through computer simulation on the basis of the above data. FIGS. 7A, 7B, 7C and 7D illustrate spherical aberration, astigmatism and distortion aberration of this apochromatic lens and optical paths of light directed from an object side to an image-formation side, respectively.

As understood from FIG. 7D, Example 6 is so formed as to automatically set lens spacing values $d_{23}$ and $d_{45}$ by bringing outer peripheral edges of the third and fourth lenses 3 and 4 into close contact with the second and fifth lenses 2 and 5, respectively.

EXAMPLE 7

First to sixth lenses 1 to 6 are made of glass materials identical to those in Example 6, while the magnification of the apochromatic lens is halved as compared with that in Example 6.

Therefore, the lenses 1 to 6 are not completely symmetrical with respect to a stop 10 dissimilarly to Examples 1 to 6, but radii of curvature $R_1$ to $R_{12}$, lens thickness values $d_1$ to $d_6$ and lens spacing values $d_{12}$ to $d_{56}$ differ from each other between a front group (first to third lenses 1 to 3) and a rear group (fourth to sixth lenses 4 to 6) with respect to the stop 10.

Figure 8C:
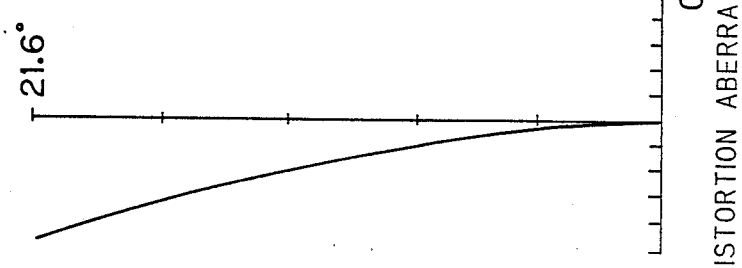
Figure 8B:
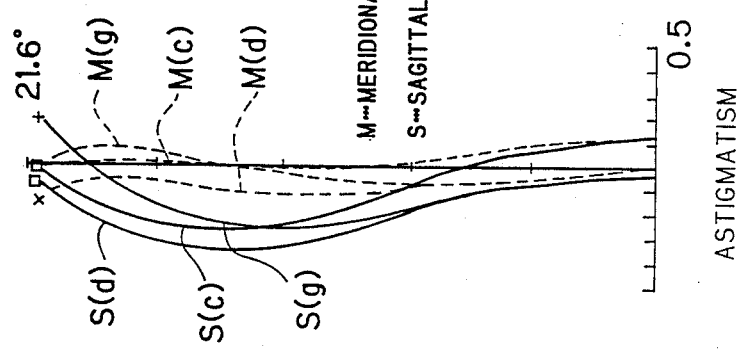
Figure 8A:
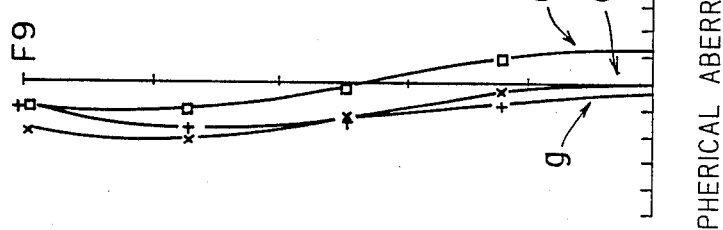

That is, the first to sixth lenses 1 to 6 shown in Table 19 are combined in the aforementioned manner, to form the apochromatic lens (see FIG. 8D).

The focal length f, the total field angle $2\theta$, the F-number F and the magnification M of this apochromatic lens are respectively set as shown in Table 22.

TABLE 22

| focal length f | 100 |
|---|---|
| total field angle $2\theta$ | 43.2° |
| F-number F | 9 |
| magnification M | 0.5 |

The radii of curvature $R_1$ to $R_{12}$, the lens thickness values $d_1$ to $d_6$ and the lens spacing values $d_{12}$ to $d_{56}$ of the first to sixth lenses 1 to 6 are respectively set as shown in Table 23.

TABLE 23

| radius of curvature | thickness of lens | spacing |
|---|---|---|
| $R_1 = 24.131$ | | |
| | $d_1 = 4.03$ | |
| $R_2 = -104.546$ | | |
| | | $d_{12} = 0.41$ |
| $R_3 = -87.226$ | | |
| | $d_2 = 1.30$ | |
| $R_4 = 20.525$ | | |
| | | $d_{23} = 0.39$ |
| $R_5 = 34.292$ | | |
| | $d_3 = 1.56$ | |
| $R_6 = 45.442$ | | |
| | | $d_{34} = 11.11$ |
| $R_7 = -32.727$ | | |
| | $d_4 = 2.00$ | |
| $R_8 = -21.386$ | | |
| | | $d_{45} = 0.42$ |
| $R_9 = -17.515$ | | |
| | $d_5 = 1.58$ | |
| $R_{10} = 125.633$ | | |
| | | $d_{56} = 0.30$ |
| $R_{11} = 137.438$ | | |
| | $d_6 = 4.23$ | |
| $R_{12} = -25.635$ | | |

Results shown in FIGS. 8A, 8B, 8C and 8D have been obtained through computer simulation on the basis of the above data. FIGS. 8A, 8B, 8C and 8D illustrate spherical aberration, astigmatism and distortion aberration of the apochromatic lens and optical paths of light directed from an object side to an image-formation side, respectively.

EXAMPLE 8

First to sixth lenses 1 to 6 are made of glass materials identical to those in Example 6, and the magnification M of the apochromatic lens is doubled as compared with that in Example 6.

Therefore, radii of curvature $R_1$ to $R_{12}$, lens thickness values $d_1$ to $d_6$ and lens spacing values $d_{12}$ to $d_{56}$ differ from each other between a front group (first to third lenses 1 to 3) and a rear group (fourth to sixth lenses 4 to 6) with respect to a stop 10, similarly to Example 7.

Figure 9C:
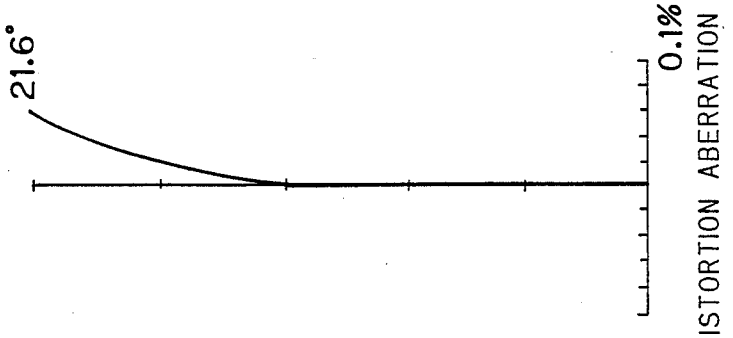
Figure 9B:
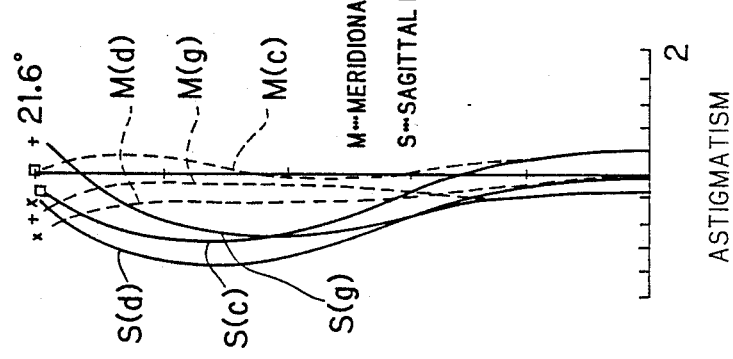
Figure 9A:
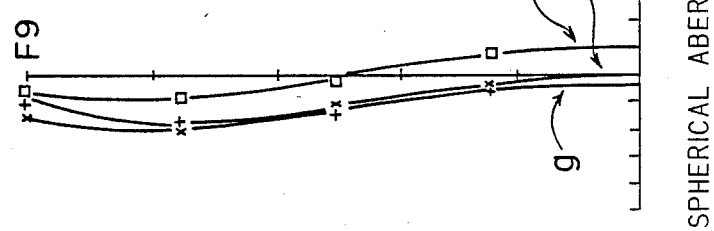

That is, the first to sixth lenses 1 to 6 shown in Table 19 are combined in the aforementioned manner, to form the apochromatic lens (see FIG. 9D).

The focal length f, the total field angle $2\theta$, the F-number and the magnification M of this apochromatic lens are respectively set as shown in Table 24.

TABLE 24

| | |
|---|---|
| focal length f | 100 |
| total field angle $2\theta$ | 43.2° |
| F-number F | 9 |
| magnification M | 2 |

The radii of curvature $R_1$ to $R_{12}$, the lens thickness values $d_1$ to $d_6$ and the lens spacing values $d_{12}$ to $d_{56}$ of the first to sixth lenses are respectively set as shown in Table 25.

TABLE 25

| radius of curvature | thickness of lens | spacing |
|---|---|---|
| $R_1 = 28.470$ | | |
| | $d_1 = 6.30$ | |
| $R_2 = -51.778$ | | |
| | | $d_{12} = 0.22$ |
| $R_3 = -47.878$ | | |
| | $d_2 = 1.30$ | |
| $R_4 = 23.412$ | | |
| | | $d_{23} = 0.31$ |
| $R_5 = 37.264$ | | |
| | $d_3 = 1.45$ | |
| $R_6 = 53.532$ | | |
| | | $d_{34} = 10.00$ |
| $R_7 = -29.112$ | | |
| | $d_4 = 2.18$ | |
| $R_8 = -19.422$ | | |
| | | $d_{45} = 0.33$ |
| $R_9 = -16.768$ | | |
| | $d_5 = 2.00$ | |
| $R_{10} = 284.461$ | | |
| | | $d_{56} = 0.24$ |
| $R_{11} = 288.497$ | | |
| | $d_6 = 4.42$ | |
| $R_{12} = -25.773$ | | |

Results shown in FIGS. 9A, 9B, 9C and 9D have been obtained through computer simulation on the basis of the above data. FIGS. 9A, 9B, 9C and 9D illustrate spherical aberration, astigmatism and distortion aberration of the apochromatic lens and optical paths of light directed from an object side to an image-formation side, respectively.

EXAMPLE 9

Figure 10C:
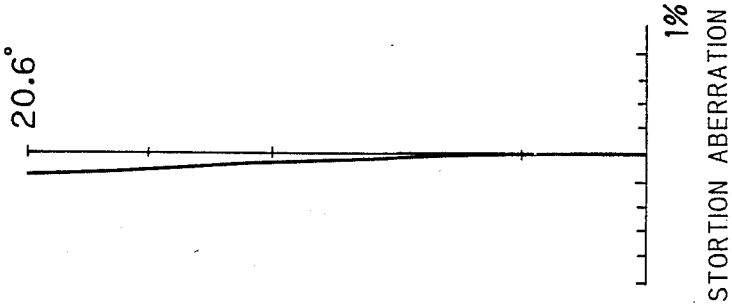
Figure 10B:
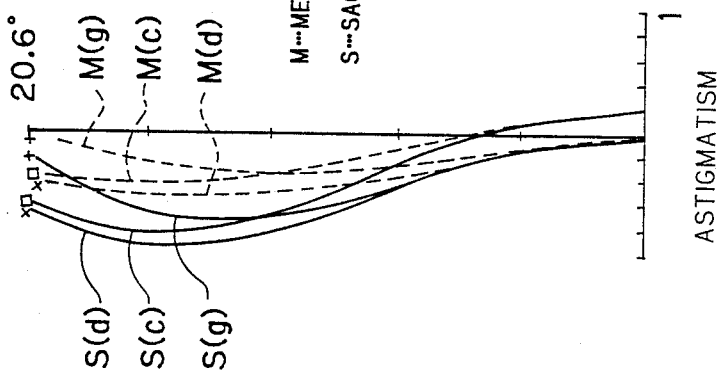
Figure 10A:
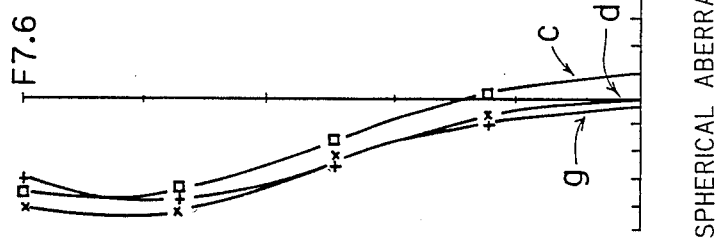

The apochromatic lens of Example 9 is not completely symmetrical, unlike to Examples 1 to 6, but first and sixth lenses 1 and 6 and third and fourth lenses 3 and 4 are different in index of refraction $n_d$, Abbe's number $\nu_d$ and partial dispersion ratio $P_{g,F}$ from each other, respectively. That is, first to sixth lenses 1 to 6 shown in Table 26 are combined in the aforementioned manner, to form the apochromatic lens (see FIG. 10D).

TABLE 26

| | 1st lens | 2nd,5th lens | 3rd lens | 4th lens | 6th lens |
|---|---|---|---|---|---|
| name | LaK06 | KzFS4 | LaK08 | LaF03 | LaK07 |
| $n_d$ | 1.67790 | 1.61340 | 1.69350 | 1.71700 | 1.67790 |
| $\nu_d$ | 50.7 | 43.8 | 50.8 | 47.9 | 53.3 |
| $P_{g,F}$ | 0.5566 | 0.5625 | 0.5551 | 0.5604 | 0.5502 |

The focal length f, the total field angle $2\theta$, the F-number F and the magnification M of this apochoromatic lens are respectively set as shown in Table 27.

TABLE 27

| | |
|---|---|
| focal length f | 100.01 |
| total field angle $2\theta$ | 41.2° |
| F-number F | 7.6 |
| magnification M | 1 |

Radii of curvature $R_1$ to $R_{12}$, lens thickness values $d_1$ to $d_6$ and lens spacing values $d_{12}$ to $d_{56}$ of the first to sixth lenses 1 to 6 are respectively set as shown in Table 28.

TABLE 28

| radius of curvature | thickness of lens | spacing |
|---|---|---|
| $R_1 = 32.362$ | | |
| | $d_1 = 6.50$ | |
| $R_2 = -63.984$ | | |
| | | $d_{12} = 0.22$ |
| $R_3 = -61.932$ | | |
| | $d_2 = 1.73$ | |
| $R_4 = 18.206$ | | |
| | | $d_{23} = 0.13$ |
| $R_5 = 19.769$ | | |
| | $d_3 = 2.36$ | |
| $R_6 = 34.590$ | | |
| | | $d_{34} = 6.90$ |
| $R_7 = -35.243$ | | |
| | $d_4 = 2.36$ | |
| $R_8 = -23.313$ | | |
| | | $d_{45} = 0.13$ |
| $R_9 = -19.627$ | | |
| | $d_5 = 1.73$ | |
| $R_{10} = 49.149$ | | |
| | | $d_{56} = 0.22$ |
| $R_{11} = 52.678$ | | |
| | $d_6 = 6.50$ | |
| $R_{12} = -28.893$ | | |

Results shown in FIGS. 10A, 10B, 10C and 10D have been obtained through computer simulation on the basis of the above data. FIGS. 10A, 10B, 10C and 10D illustrate spherical aberration, astigmatism and distortion aberration of this apochromatic lens and optical paths of light directed from an object side to an image-formation side, respectively.

In each Example, there is no lens vignetting with respect to a small F-number, and the amount of light is uniform. Further, it is clear from the spherical aberration diagrams (FIGS. 2A, 3A, 4A, 5A, 6A, 7A, 8A and 9A and 10A) that difference in zonal spherical aberration values caused by three colors is extremely small and it is clear from the astigmatism diagrams (FIGS. 2B, 3B, 4B, 5B, 6B, 7B, 8B, 9B and 10B) that curvature values of sagittal and meridional image fields are small and astigmatic difference values are also small, while it is clear from the distortion aberration diagrams (FIGS. 2C, 3C, 4C, 5C, 6C, 7C, 8C, 9C and 10C) that distortion aberration values are also extremely small.

Figure 11:
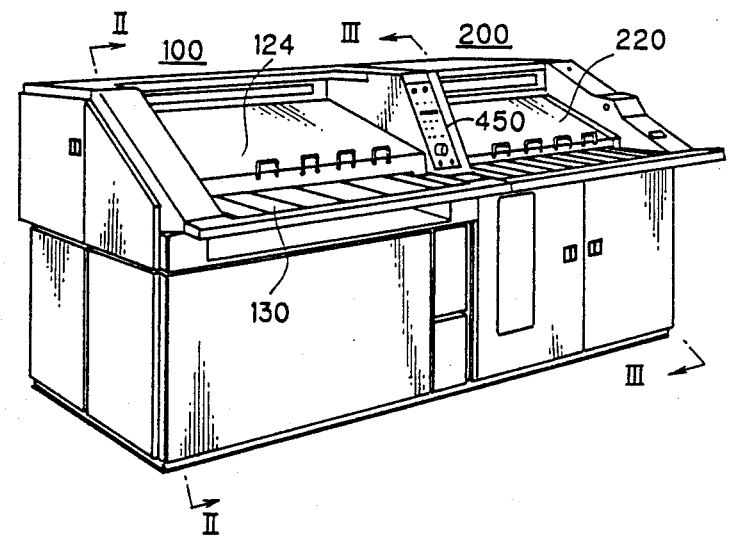
FIG. 11 is a perspective view showing an apparatus for color reproduction to which the aforementioned apochromat optical system is applied.
Figure 12:
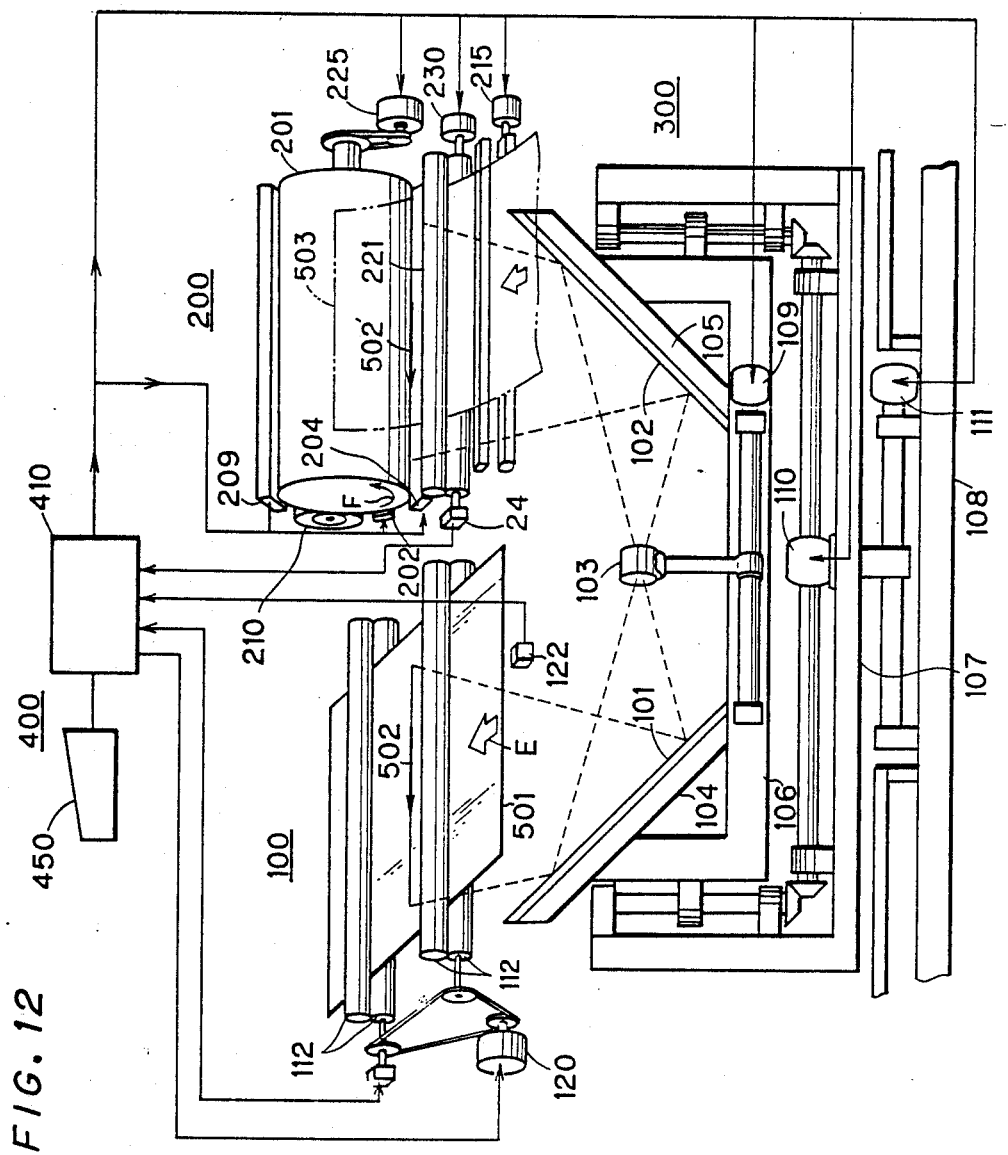
FIG. 12 is a schematic block diagram of the apparatus for color reproduction.

FIG. 11 is a perspective view showing an apparatus for color reproduction (hereinafter referred to as "copying apparatus") to which the aforementioned apochromatic lens is applied, and FIG. 12 is a schematic block diagram of the copying apparatus.

As shown in FIGS. 11 and 12, the copying apparatus is formed by a main frame 108, an original scanning part 100 for feeding an original 501 in a direction E, an optical part 300 for applying light onto the original 501 and a guide for guiding reflected light to a recording part as hereinafter described, a recording part 200 for recording an image 502 of the original 501 on a copying paper 503 and a control part 400 for controlling the entire apparatus.

Figure 13:
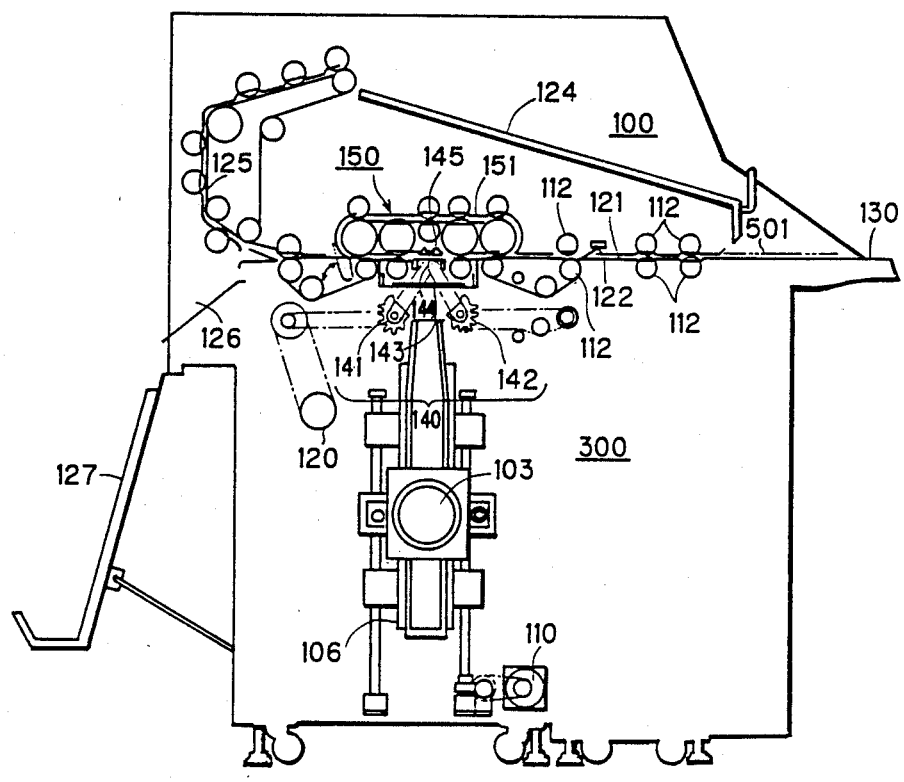
FIG. 13 is a sectional view taken along line II—II in FIG. 11.

FIG. 13 is a sectional view taken along line II—II in FIG. 11. As shown in FIGS. 12 and 13, the original scanning part 100 has a large number of feed rollers 112, which are rotated by a motor 120 to feed the original 501 in the direction E (FIG. 12). As shown in FIG. 13, when the feed rollers 112 rotate, the original 501 is fed between an original glass plate 144 and an original cover plate 145 for preventing floating of the original 501 and then discharged onto an original receiving tray 124, which is provided in a front upper side of the copying apparatus, through a discharge path 125. If the original 501 is formed by a relatively thick sheet material and it is inconvenient to bend the same, the original 501 is discharged to another original receiving tray 127 through another discharge path 126 extending in a rear portion of this copying apparatus. A detector 122 is provided in a prescribed position in order to detect whether or not the original 501 is present on a feed path 121 for the original 501.

An original repeating part 150 is opposed to the original glass plate 144 in order to record a plurality of identical images 502 of the original 501. The original repeating part 150 is adapted to move the original 501 between the original glass plate 144 and the original cover plate 145, a required number of times.

As shown in FIG. 13, the optical part 300 is provided with an illuminating part 140 which is formed by a pair of light sources 141 and 142 and a glass member 143, which prevents heat from transferring to the original scanning part 100. The illuminating part 140 projects light, which is applied onto the original 501 placed on the original glass plate 144. As shown in FIG. 12, reflected light reflected by the original 501 is guided to the recording part 200 through a mirror 101, an apochromatic lens 103 and another mirror 102.

As shown in FIG. 12, the apochromatic lens 103 is movable between the mirrors 101 and 102 by a motor 109, and also movable in a direction perpendicular to the plane of FIG. 12 by another means (not shown). The structure of the apochromatic lens 103 is similar to that shown in FIG. 1, and hence the description thereof is omitted.

The mirrors 101 and 102 and the apochromatic lens 103 are supported by an optical bench 106. This optical bench 106 is supported by a base frame 107, and is vertically movable with respect to the base frame 107 by a motor 110. The base frame 107 is placed on the main frame 108, to be movable in a direction parallel to the direction of movement of the apochromatic lens 103.

Figure 14:
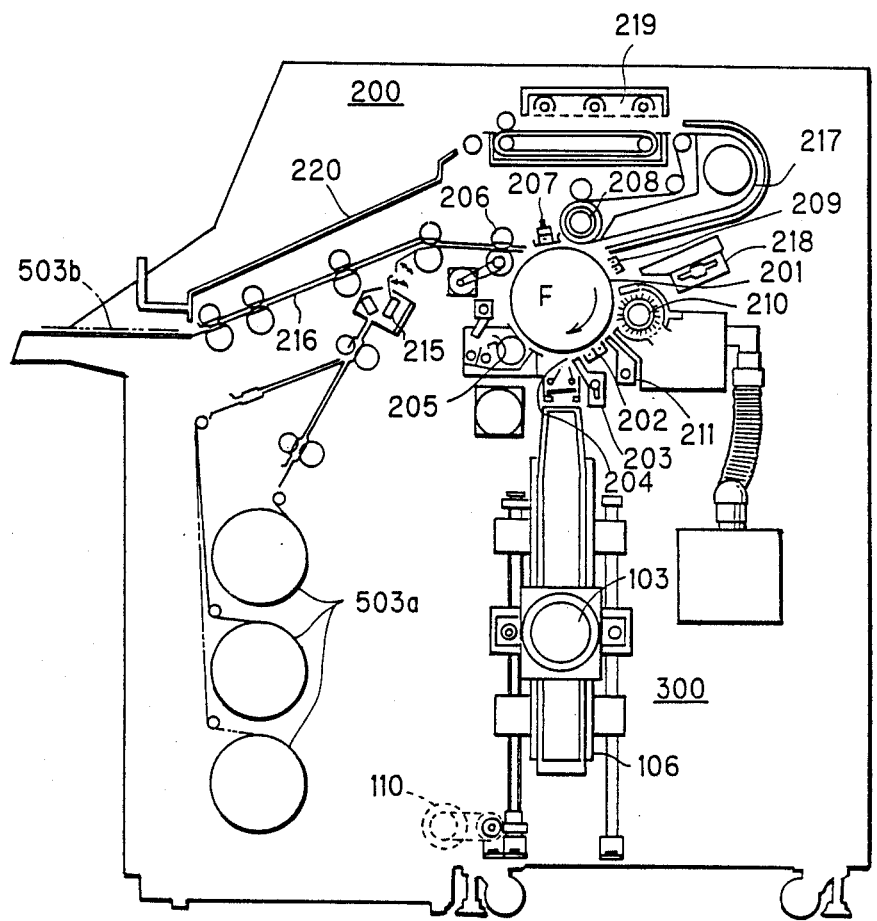
FIG. 14 is a sectional view taken along line III—III in FIG. 11.

FIG. 14 is a sectional view taken along line III—III in FIG. 11. As shown in FIG. 14, a charger 202, a discharger 203, an exposure part 204, a toner developer 205, a paper feeding part 206, a toner transferor 207, a separator 208 for separating the copying paper 503 from a photosensitive drum 201, another discharger 209, a cleaner 210 and still another discharger 211 are sequentially provided around the photosensitive drum 201.

A plurality of roll-type copying papers 503a, which are different in width from each other, are prepared in the paper feeding part 206 to allow appropriate selection of the copying paper 503, while a cutter 215 is provided in a prescribed position to cut the copying papers 503a to required lengths. Further, a manual feeding path 216 is separately provided in order to feed a sheet-type copying paper 503b, if desired.

As shown in FIG. 14, an endless bent 217 and a fan 218 are provided in correspondence to the separator 208, in order to eject the copying paper 503 separated from the photosensitive drum 201 by the separator 208 to a prescribed position. Numeral 219 denotes a heating device, which melts a toner and fixes image 502' (FIG. 12) on the copying paper 503.

As shown in FIG. 12, the control part 400 is formed by an operation panel 450 and control means 410 including a microcomputer, a memory and the like. The control means 410 is supplied with a command from an operator through the operation panel 450, as well as with a detection signal from a sensor provided in the copying apparatus. The control means 410 outputs control signals for controlling the respective parts of the copying apparatus on the basis of the signal and the command.

Figure 15:
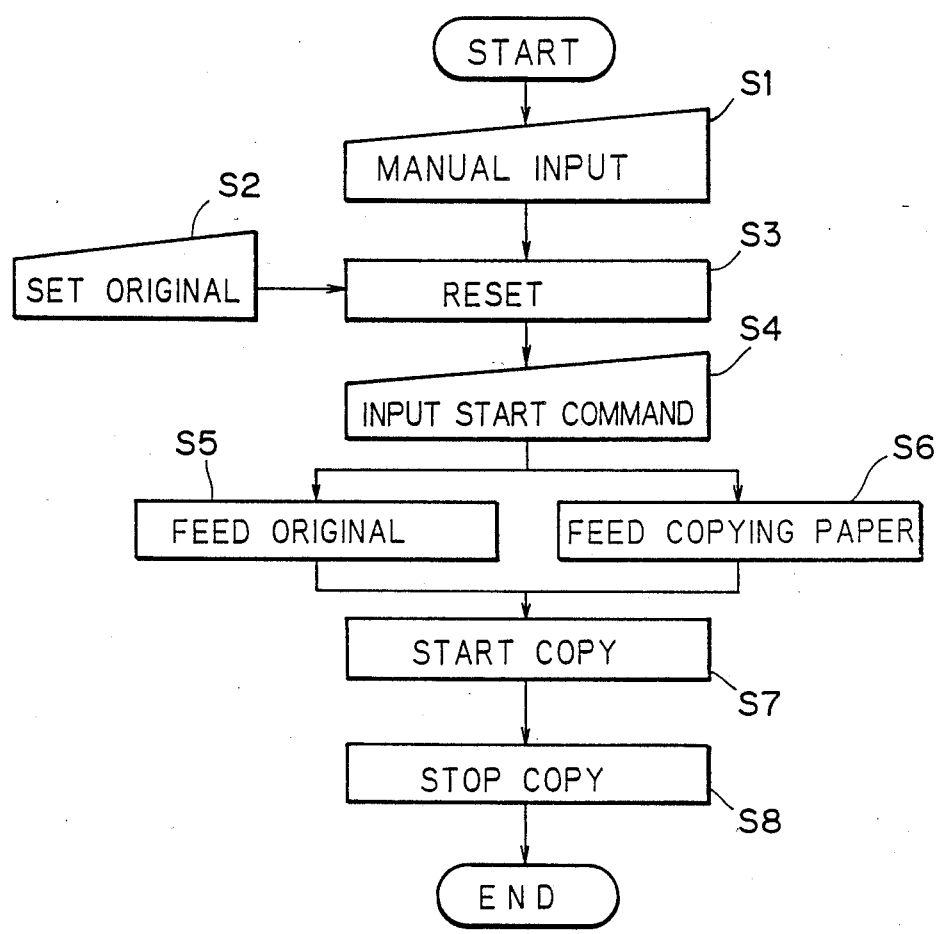
FIG. 15 is a flow chart showing the operation of the apparatus for color reproduction.

FIG. 15 is a flow chart showing the operation of the copying apparatus. When the operator inputs data such as the magnification, the number of copies and the like through the operation panel 450 (step S1), the memory provided in the control means 410 stores this data. At the same time, the motor 110 is driven to vertically move the optical bench 106 in response to a command from the control means 410, while the motor 109 is driven to horizontally move the apochromatic lens 103. Thus, setting of the magnification is completed.

Then, the operator sets the original 501 on the center of a table 130 in the original scanning part 100 so that the image 502 faces down (step S2). The detector 122 detects the forward end of the original 501, and control data are reset in the control means 410 (step S3).

Thereafter the operator supplies a start command to the control means 410 through the operation panel 450 (step S4), whereby the copying apparatus is controlled in response to the command from the control means 410:, as follows The motor 120 of the original scanning part 100 is driven to feed the original 501 by a prescribed amount (step S5). At the same time, a motor 230 of the recording part 200 is also driven to feed the copying paper 503 by a feed roller 221 (step S6). A pulse generator 24 coupled to the feed roller 221 outputs pulse signals, which are sequentially counted by the control means 410. When the count number reaches a prescribed value, illumination light is applied to the original 501 and copying operation is started (step S7). That is, the original 501 is fed in the direction E to be exposed to the illumination light, while reflected light reflected by the original 501 exposes the photosensitive drum 201 through the mirror 101, the apochromatic lens 103 and the mirror 102. Further, a latent image formed on the photosensitive drum 201 is visualized by the developer 205, and thereafter the toner image 502' is recorded on the copying paper 503 by the toner transferor 207. Thus, the image 502 on the original 501 is sequentially copied on the copying paper 503.

When the amount of feeding of the copying paper 503 reaches a constant value, driving of the recording part 200 is released to stop recording of the image 502. Further, a prescribed amount of the copying paper 503 is fed, and then feeding of the copying paper 503 is stopped. Then, the copying paper 503 is cut by the rotary cutter 215, to be discharged on a paper receiving tray 220. At the same time, the original 501 is also discharged on the original receiving tray 124, whereby the copying apparatus is stopped (step S8).

As described, above the image 502 on the original 501 can be more clearly copied on the copying paper 503 by applying the aforementioned apochromatic lens to the copying apparatus.

Although the apochromatic lens 103 is applied to the electrophotocopying apparatus in which the original 501 is scanned as described above the copying apparatus is not restricted to this type of device. Rather, apochromatic lens according to the present invention is applicable to all types of general copying apparatuses.

Although the present invention has been described and illustrated in detail, it is to be clearly understood that the same is by way of illustration and example only and is not to be taken by way of limitation, the spirit and scope of the present invention being limited only by the scope of the appended claims.

What is claimed is:

1. An apochromat optical system, comprising:
a stop provided along the optical axis of the system;
a first lens group including: a first lens having a positive power, said first lens having a convex surface which is directed to the object side; a second lens made of Kultz Flint glass having an Abbe's number within the range from 45.0 through 34.0, said second lens having a negative power and having a concave surface which is directed to the image side; and a third lens in the form of meniscus having a positive power, said third lens having a convex surface which is directed to the object side, said first through third lenses being successively disposed in order from the object side of the system, and
a second lens group including a set of lenses having substantially the same configuration as the lenses in the first lens group, the lenses of said first and second lens groups being approximately symmetrically disposed with respect to said stop;
the lenses of said first lens group satisfying the following:

$n_3 > n_2$ $1.08 > \{(n_1+n_3)/2\}/n_2 > 1.01$ $\nu_1 > \nu_2$ $\nu_3 > \nu_2$ $1.3 > \{(\nu_1+\nu_3)/2\}/\nu_2 > 1.0$ and wherein $n_1$, $n_2$ and $n_3$ represent the refractive index of the first, second and third lenses, respectively; and $\nu_1$, $\nu_2$ and $\nu_3$ are the Abbe's numbers of the first, second and third lenses, respectively.

2. An apochromat optical system as set forth in claim 1, wherein said second lens group comprises:
a fourth lens in the form of meniscus having a positive power, said fourth lens having a convex surface which is directed to the image; side
a fifth lens made of Kultz Flint glass having an Abbe's number within the range from 45.0 through 34.0, said fifth lens having a negative power and having a concave surface which is directed to the object; side and a sixth lens having a positive power, said sixth lens having a convex surface which is directed to the image, side said fourth through sixth lenses being successively disposed in order from the stop,
said second lens group satisfying the following:

$n_4 > n_5$ $1.08 > \{(n_4+n_6)/2\}/n_5 > 1.01$ $\nu_4 > \nu_5$ $\nu_6 > \nu_5$ and $1.3 > \{(\nu_4+\nu_6)/2\}/\nu_5 > 1.0$ where $n_4$, $n_5$ and $n_6$ are the refractive indexes of the fourth, fifth and sixth lenses, respectively; and $\nu_4$, $\nu_5$ and $\nu_6$ and the Abbe's numbers of the fourth, fifth and sixth lenses, respectively.

3. An apparatus for producing color reproductions, comprising:
a light source for illuminating an original to be reproduced;
an original holder for holding a color original thereon;
photosensitive means for reproducing an image of the original upon receiving light from the original to be reproduced;
an apochromat optical system disposed optically between said original holder and said photosensitive means,
said optical system comprising: a stop provided along the optical axis of the apparatus; a first lens group including: a first lens having a positive power, said first lens having a convex surface which is directed to the original; a second lens made of Kultz Flint glass having an Abbe's number within the range from 45.0 through 34.0, said second lens having a negative power and having a concave surface which is directed to the photosensitive means; and a third lens in the form of meniscus having a positive power, said third lens having a convex surface which is directed to the original, said first through third lenses being successively disposed in order with the first lens nearer the original; and a second lens group including lenses of a substantially same configuration of the lenses in the first lens group, the lenses of said first and second lens groups being approximately symmetrical with respect to said stop; and said lenses of the first lens group satisfying:

$n_3 > n_2$ $1.08 > \{(n_1+n_3)/2\}/n_2 > 1.01$ $\nu_1 > \nu_2$ $\nu_3 > \nu_2$ $1.3 > \{(\nu_1+\nu_3)/2\}/\nu_2 > 1.0$ and where $n_1$, $n_2$ and $n_3$ are the refractive indexes of the first, second and third lenses, respectively; and $\nu_1$, $\nu_2$ and $\nu_3$ are the Abbe's numbers of the first, second and third lenses, respectively.

4. An apparatus as set forth in claim 3, wherein said second lens group comprises:

a fourth lens in the form of meniscus having a positive power, said fourth lens having a convex surface which is directed to the photosensitive means;

a fifth lens made of Kultz Flint glass having an Abbe's number within the range from 45.0 through 34.0, said fifth lens having a negative power and having a concave surface which is directed to the original; and a sixth lens having a positive power, said sixth lens having a convex surface which is directed to the photosensitive means, said fourth through sixth lenses being successively disposed in order from the stop, said second lens group satisfying the following:

$n_4 > n_5$ $1.08 > \{(n_4+n_6)/2\}/n_5 > 1.01$ $\nu_4 > \nu_5$ $\nu_6 > \nu_5$ and $1.3 > \{(\nu_4+\nu_6)/2\}/\nu_5 > 1.0$ wherein $n_4$, $n_5$ and $n_6$ are the refractive indexes of the fourth, fifth and sixth lenses, respectively; and $\nu_4$, $\nu_5$ and $\nu_6$ are the Abbe's numbers of the fourth, fifth and sixth lenses, respectively.

* * * * *